United States Patent
Raslambekov

(10) Patent No.: US 11,058,515 B1
(45) Date of Patent: Jul. 13, 2021

(54) SYSTEMS AND METHODS FOR FORMING DENTAL APPLIANCES

(71) Applicant: Oxilio Ltd, Larnaca (CY)

(72) Inventor: Islam Khasanovich Raslambekov, Long Island City, NY (US)

(73) Assignee: Arkimos Ltd., Larnaca (CY)

( * ) Notice: Subject to any disclaimer, the term of this patent is extended or adjusted under 35 U.S.C. 154(b) by 0 days.

(21) Appl. No.: 17/143,085

(22) Filed: Jan. 6, 2021

(51) Int. Cl.
  *A61C 7/00* (2006.01)
  *A61C 7/08* (2006.01)
  *G06F 30/00* (2020.01)

(52) U.S. Cl.
  CPC .......... *A61C 7/002* (2013.01); *A61C 7/08* (2013.01); *G06F 30/00* (2020.01); *A61C 2007/004* (2013.01)

(58) Field of Classification Search
  CPC ..... A61C 7/002; A61C 7/08; A61C 2007/004; G06F 30/00
  USPC .............................................. 703/1
  See application file for complete search history.

(56) References Cited

U.S. PATENT DOCUMENTS

| | | |
|---|---|---|
| 5,975,893 A | 11/1999 | Chishti et al. |
| 6,183,248 B1 | 2/2001 | Chishti et al. |
| 6,227,850 B1 | 5/2001 | Chishti et al. |
| 6,309,215 B1 | 10/2001 | Phan et al. |
| 6,318,994 B1 | 11/2001 | Chishti et al. |
| 6,334,853 B1 | 1/2002 | Kopelman et al. |
| 6,386,878 B1 | 5/2002 | Pavlovskaia et al. |
| 6,398,548 B1 | 6/2002 | Muhammad et al. |
| 6,463,344 B1 | 10/2002 | Pavloskaia et al. |
| 6,471,511 B1 | 10/2002 | Chishti et al. |

(Continued)

FOREIGN PATENT DOCUMENTS

| | | |
|---|---|---|
| WO | 98058596 A1 | 12/1998 |
| WO | 00019928 A1 | 4/2000 |

(Continued)

OTHER PUBLICATIONS

SoftSmile https://softsmile.com/SoftSmile's digital treatment planning software, Vision, was built by doctors, for doctors. Our machine-learning algorithms are designed to help doctors model the most optimal treatment for their patients. Retrieved from the Internet on Feb. 24, 2021.

(Continued)

*Primary Examiner* — Cedric Johnson
(74) *Attorney, Agent, or Firm* — BCF LLP

(57) ABSTRACT

A method and a system for determining a cut line of an aligner are provided. The method comprises: obtaining 3D model data of a plurality of teeth and a gingiva of a subject; obtaining, using the 3D model data, for each one of the plurality of teeth, a respective one of a plurality of individual intersection loops; segmenting, based on a predetermined rule, each one of the plurality of individual intersection loops into at least a buccal portion and a lingual portion; sequentially joining respective buccal portions and respective lingual portions associated with each one of the plurality of individual intersection loops, thereby generating a single arch form loop; smoothing the single arch form loop, thereby generating a smoothed single arch form loop; and applying the smoothed single arch form loop to an unfinished aligner to indicate the cut line on the unfinished aligner for producing the aligner.

20 Claims, 12 Drawing Sheets

(56) References Cited

U.S. PATENT DOCUMENTS

| | | |
|---|---|---|
| 6,554,611 B2 | 4/2003 | Chishti et al. |
| 6,602,070 B2 | 8/2003 | Miller et al. |
| 6,665,570 B2 | 12/2003 | Pavloskaia et al. |
| 6,685,470 B2 | 2/2004 | Chishti et al. |
| 6,688,886 B2 | 2/2004 | Hughes et al. |
| 6,705,863 B2 | 3/2004 | Phan et al. |
| 6,726,478 B1 | 4/2004 | Isiderio et al. |
| 6,739,870 B2 | 5/2004 | Lai et al. |
| 6,767,208 B2 | 7/2004 | Kaza |
| 6,979,196 B2 | 12/2005 | Nikolskiy et al. |
| 7,040,896 B2 | 5/2006 | Pavlovskaia et al. |
| 7,059,850 B1 | 6/2006 | Phan et al. |
| 7,063,532 B1 | 6/2006 | Jones et al. |
| 7,123,767 B2 | 10/2006 | Jones et al. |
| 7,125,248 B2 | 10/2006 | Phan et al. |
| 7,134,874 B2 | 11/2006 | Chishti et al. |
| 7,220,122 B2 | 5/2007 | Chishti |
| 7,241,142 B2 | 7/2007 | Abolfathi et al. |
| 7,293,988 B2 | 11/2007 | Wen |
| 7,320,592 B2 | 1/2008 | Chishti et al. |
| 7,373,286 B2 | 5/2008 | Nikolskiy et al. |
| 7,377,778 B2 | 5/2008 | Chishti et al. |
| 7,428,481 B2 | 9/2008 | Nikolskiy et al. |
| 7,442,040 B2 | 10/2008 | Kuo |
| 7,637,740 B2 | 12/2009 | Knopp |
| 7,689,398 B2 | 3/2010 | Cheng et al. |
| 7,711,447 B2 | 5/2010 | Lu et al. |
| 7,771,195 B2 | 8/2010 | Knopp et al. |
| 7,826,646 B2 | 11/2010 | Pavlovskaia et al. |
| 7,841,858 B2 | 11/2010 | Knopp et al. |
| 7,844,429 B2 | 11/2010 | Matov et al. |
| 7,865,259 B2 | 1/2011 | Kuo et al. |
| 7,904,307 B2 | 3/2011 | Abolfathi et al. |
| 7,905,725 B2 | 3/2011 | Chishti et al. |
| 7,942,672 B2 | 5/2011 | Kuo |
| 7,993,134 B2 | 8/2011 | Wen |
| 8,038,444 B2 | 10/2011 | Kitching et al. |
| 8,044,954 B2 | 10/2011 | Kitching et al. |
| 8,108,189 B2 | 1/2012 | Chelnokov et al. |
| 8,131,393 B2 | 3/2012 | Matov et al. |
| 8,135,569 B2 | 3/2012 | Matov et al. |
| 8,244,390 B2 | 8/2012 | Kuo et al. |
| 8,439,672 B2 | 5/2013 | Matov et al. |
| 8,465,280 B2 | 6/2013 | Sachdeva et al. |
| 8,478,435 B2 | 7/2013 | Kuo et al. |
| 8,639,477 B2 | 1/2014 | Chelnokov et al. |
| 8,641,414 B2 | 2/2014 | Borovinskih et al. |
| 8,734,150 B2 | 5/2014 | Wen |
| 8,780,106 B2 | 7/2014 | Chishti et al. |
| 8,807,999 B2 | 8/2014 | Kuo et al. |
| 8,896,592 B2 | 11/2014 | Boltunov et al. |
| 8,897,902 B2 | 11/2014 | See et al. |
| 8,961,173 B2 | 2/2015 | Miller |
| 9,060,829 B2 | 6/2015 | Sterental et al. |
| 9,107,722 B2 | 8/2015 | Matov et al. |
| 9,161,823 B2 | 10/2015 | Morton et al. |
| 9,211,166 B2 | 12/2015 | Kuo et al. |
| 9,326,831 B2 | 5/2016 | Cheang |
| 9,345,557 B2 | 5/2016 | Anderson et al. |
| 9,375,293 B2 | 6/2016 | Taub et al. |
| 9,375,300 B2 | 6/2016 | Matov et al. |
| 9,414,897 B2 | 8/2016 | Wu |
| 9,433,476 B2 | 9/2016 | Khardekar et al. |
| 9,529,970 B2 | 12/2016 | Andreiko |
| 9,592,103 B2 | 3/2017 | Taub et al. |
| 9,610,140 B2 | 4/2017 | Anderson et al. |
| 9,622,834 B2 | 4/2017 | Chapoulaud et al. |
| 9,792,413 B2 | 10/2017 | Badawi |
| 9,844,424 B2 | 12/2017 | Wu |
| 10,011,050 B2 | 7/2018 | Kitching et al. |
| 10,076,389 B2 | 9/2018 | Wu et al. |
| 10,307,222 B2 | 6/2019 | Morton et al. |
| 10,332,164 B2 | 6/2019 | Abolfathi et al. |
| 10,383,704 B2 | 8/2019 | Kitching |
| 10,405,947 B1 | 9/2019 | Kaza et al. |
| 10,405,951 B1 | 9/2019 | Kopelman et al. |
| 10,413,385 B2 | 9/2019 | Sherwood et al. |
| 10,433,934 B2 | 10/2019 | Kopelman |
| 10,463,452 B2 | 11/2019 | Matov et al. |
| 10,466,676 B1 | 11/2019 | Do et al. |
| 10,470,846 B2 | 11/2019 | Kopelman et al. |
| 10,524,880 B2 | 1/2020 | Wen |
| 10,553,309 B2 | 2/2020 | Trosien et al. |
| 10,561,476 B2 | 2/2020 | Matov et al. |
| 10,595,965 B2 | 3/2020 | Khardekar et al. |
| 10,617,489 B2 | 4/2020 | Grove et al. |
| 10,650,517 B2 | 5/2020 | Parpara et al. |
| 10,653,503 B2 | 5/2020 | Boltunov et al. |
| 10,687,916 B1 | 6/2020 | Dargis et al. |
| 10,783,629 B2 | 9/2020 | Parpara et al. |
| 10,792,127 B2 | 10/2020 | Kopelman et al. |
| 10,813,721 B2 | 10/2020 | Sterental et al. |
| 2005/0244791 A1 | 11/2005 | Davis et al. |
| 2013/0095446 A1 | 4/2013 | Andreiko et al. |
| 2013/0325431 A1* | 12/2013 | See .............. G06T 19/00 703/11 |
| 2014/0288894 A1 | 9/2014 | Chishti et al. |
| 2015/0157421 A1* | 6/2015 | Martz .............. A61C 7/08 433/6 |
| 2016/0302885 A1 | 10/2016 | Matov et al. |
| 2017/0035536 A1 | 2/2017 | Alvarez Garcia et al. |
| 2017/0079748 A1 | 3/2017 | Andreiko |
| 2018/0039755 A1 | 2/2018 | Matov et al. |
| 2018/0116762 A1 | 5/2018 | Kopelman et al. |
| 2018/0165818 A1 | 6/2018 | Tsai et al. |
| 2018/0304497 A1 | 10/2018 | Kitching et al. |
| 2019/0000592 A1 | 1/2019 | Cam et al. |
| 2019/0046295 A1 | 2/2019 | Morton et al. |
| 2019/0102880 A1 | 4/2019 | Parpara et al. |
| 2019/0282333 A1 | 9/2019 | Matov et al. |
| 2019/0298494 A1* | 10/2019 | Webber .............. A61C 7/146 |
| 2019/0314117 A1 | 10/2019 | Morton et al. |
| 2019/0357997 A1 | 11/2019 | Shi et al. |
| 2020/0000551 A1 | 1/2020 | Li |
| 2020/0000552 A1 | 1/2020 | Mednikov et al. |
| 2020/0100864 A1 | 4/2020 | Wang et al. |
| 2020/0125069 A1* | 4/2020 | Sirovskiy .............. G06T 19/20 |
| 2020/0146776 A1 | 5/2020 | Matov et al. |
| 2020/0229900 A1 | 7/2020 | Cunliffe et al. |
| 2020/0281689 A1* | 9/2020 | Yancey .............. A61B 5/4547 |
| 2020/0297459 A1 | 9/2020 | Grove et al. |
| 2020/0306012 A1* | 10/2020 | Roschin .............. G06F 30/10 |
| 2020/0315743 A1* | 10/2020 | Raslambekov .......... A61C 7/08 |

FOREIGN PATENT DOCUMENTS

| | | |
|---|---|---|
| WO | 00019930 A1 | 4/2000 |
| WO | 00019931 A1 | 4/2000 |
| WO | 00069356 A1 | 11/2000 |
| WO | 00069357 A1 | 11/2000 |
| WO | 01074268 A1 | 11/2001 |
| WO | 2018085718 A2 | 5/2018 |
| WO | 2019089989 A2 | 5/2019 |

OTHER PUBLICATIONS

ArchForm; Retrieved at https://www.archform.co/ Great aligners are made with powerful software. Retrieved from the Internet on Feb. 24, 2021.

* cited by examiner

SYSTEMS AND METHODS FOR FORMING DENTAL APPLIANCES

FIELD

The present technology relates to systems and methods for manufacturing a dental appliance; and more specifically, although not exclusively, to determining a cut line for forming a dental appliance from an unfinished dental appliance.

BACKGROUND

In orthodontics, treatments for achieving alignment of malposed teeth in a subject include applying dental appliances, such as orthodontic aligners, to subject's teeth. Orthodontic aligners are typically worn over teeth of an arch form in order to exert a force to the subject's teeth to align malocclusions or to retain teeth positions.

Orthodontic aligners are typically custom-made to the subject's teeth and designed to exert the predetermined force causing the teeth to move in a desired direction associated with the alignment thereof within the arch form. Generally, the shape of the aligner, among other factors, defines the effective forces to be exerted to the teeth and the effective correction that may be attained. Certain methods of designing such an aligner may comprise obtaining a 3D representation of the arch form, and based thereon, determining the required treatment plan for the teeth requiring alignment, which may comprise multiple sequential treatment steps in which different aligners, each with a different desired configuration, are to be worn by the subject.

The aligners can be made by a thermoforming process, in which a preform is shaped using a mold to produce an unfinished aligner. The unfinished aligner is further processed, such as by trimming excess material along a predetermined cut line to form the aligner for use by the subject. In some cases, the cut line may be determined based on the 3D representation and correspond to a tooth-gingiva boundary between crown portions of the subject's teeth and the subject's gingiva.

However, some of the subject's teeth may have interdental spaces therebetween—such as those caused by missing teeth or from an independent orthodontic condition. Such interdental spaces may introduce challenges in determining a "true" cut line, i.e. a cut line which follows closely the tooth-gingiva boundary of the subject, due to difficulties in defining a tooth-gingiva boundary in the absence of a tooth. A cut line which does not follow the tooth-gingiva boundary of the subject may result in a subsequent aligner made using the cut line which is uncomfortable to wear for the subject, which may affect the adherence of the subject to the orthodontic treatment. Furthermore, such an aligner may also be ineffective for implementing the orthodontic treatment.

Certain approaches for determining the cut line for forming the aligner have been proposed in the prior art.

United States Patent Application Publication No.: 2020/281,689-A1 published on Sep. 10, 2020, assigned to SDC US Smilepay SPV, and entitled "Systems and Methods for Trimming Dental Aligners" discloses a method of cutting a dental aligner including identifying a gingival line in a model representative of a user's dentition where the gingival line is an interface of a teeth portion and a gingival portion of the model, generating a plurality of points in the gingival portion of the model where each point of the plurality of points is generated at a threshold distance from the gingival line, generating a cut line that intersects at least some of the points of the plurality of points, and controlling a cutting system to cut the dental aligner along the cut line.

United States Patent Application Publication No.: 2020/125,069-A1 published on Apr. 23, 2020, assigned to Ormco Corp., and entitled "Systems and Methods for Designing and Manufacturing an Orthodontic Appliance" discloses systems and methods of defining a trimline in relation to modeled teeth including modeled gingiva. The trimline is used to manufacture an aligner. A margin point is placed proximate a gingival margin at each tooth on at least one jaw in the model. A trimline connects the plurality of margin points from which machine code is generated. The aligner manufactured includes an edge that correlates with the trimline according to the machine code. A margin point may be proximate a gingival zenith. At least one tooth cooperates with the modeled gingiva to define a line around the tooth. The trimline includes at least one tooth curve and at least one connector curve connected to the tooth curve at a transition point. At least one control point is on the trimline between two margin points. The trimline is defined by a spline that may be a Bezier curve.

United States Patent Application Publication No.: 2018/116,762-A1 published on May 3, 2018, assigned to Align Technology Inc., and entitled "Mold and Aligner with Cut Line Markings" discloses adding customized cut line information to a shell that is to be formed over a mold of a dental arch. In one embodiment, a cut line is determined for the shell. A processing device determines one or more markings for the shell that will mark the cut line. The processing device determines one or more features to add to the mold over which the shell will be formed that will cause the shell to have the one or more markings. The processing device generates a digital model of the mold, the digital model comprising the one or more features, wherein the digital model is usable to manufacture the mold having the one or more features.

U.S. Pat. No. 7,711,447-B2 issued on May 4, 2010, assigned to Align Technology Inc., and entitled "System and Method for Automated Generating of a Cutting Curve on a Surface" discloses a computer-implemented method for automated generating of a cutting curve on a gingival surface to facilitate cutting of an aligner material comprises the defining of initial gingival curves along the line around a tooth (LAT) on a patient's jaw, including within an interproximal area between teeth. The initial gingival curves are replaced with a modified, dynamic cutting curve comprising an offset adjustment configured to minimize weakening of a region of the aligner material within the interproximal area. This process for generating a modified, dynamic cutting curve within an interproximal area can be suitably applied or continued for each of other the teeth and interproximal areas between those teeth to define a complete dynamic cutting curve. The resulting complete dynamic cutting curve can then be output for conversion into machine executable code to facilitate cutting of the aligner material.

SUMMARY

It is an object of the present technology to ameliorate at least some of the inconveniences present in the prior art.

Developers of the present technology have realized that the effectiveness of the orthodontic treatment may be increased if the aligner is as comfortable as possible for the subject. Important to the comfort is an edge at an open end of the aligner. The edge, also referred to herein as "cut line" should be continuous, taking into account interdental spaces therebetween, as well as smooth, and ideally should follow a tooth-gingiva boundary of the subject. The edge of the aligner, when the aligner is worn over teeth of the subject, should preferably not interfere with the subject's gingiva. In certain embodiments, the cut line for the aligner is determined based on respective individual segmentation loops associated with each one of the subject's teeth taking into account interdental spaces therebetween.

More specifically, non-limiting embodiments of the present technology are directed to methods and systems for determining the cut line including: (1) receiving the 3D representation of the subject's arch form, the arch form comprising a plurality of teeth and gingiva; (2) obtaining, for each tooth of the plurality of teeth, a segmentation loop indicative of intersection thereof with the gingiva; (3) translating the segmentation loop of each tooth in a direction of an associated crown of the tooth; (4) segmenting each segmentation loop into at least a lingual portion and a buccal portion; and (5) sequentially joining respective lingual portions and buccal portions of the segmentation loops of all the teeth thereby generating the cut line.

According to certain non-limiting embodiments of the present technology, the segmenting a given individual segmentation loop may be executed by obtaining representations of so-called bridges—specific interdental fillers extending between a given pair of adjacent teeth in a mesiodistal direction, which thus "cut out" mesial and distal portions of the given individual segmentation loop leaving only the lingual and buccal portions thereof for further generating the cut line.

Thus, the so-generated cut line may be applied to a model of the aligner to define the open edge of the aligner in the model. In certain other embodiments, the cut line may be applied to the physical unfinished aligner to produce the finished aligner by cutting along the cut line and discarding the excess material. In certain embodiments, the so-generated cut line may be used to cause cutting of the aligner without a physical application of the cut line to the aligner. The so-determined cut line may define an open edge of the aligner and may thus be used for generating an aligner 3D representation of the aligner, which may further be used for producing the aligner, for example, by means of 3D printing. The so produced aligner using the may avoid or minimize discomfort to the subject when the subject wears the aligner as the open edge of the aligner may follow a contour of the tooth-gum boundary, even in the presence of interdental spaces in the subject's archform. The cut-line may extend along a surface of the crown portion of the subject's teeth. The aligner produced based on such a cut line may be free of contact with the adjacent gingiva, which may improve the comfort of wearing it by the subject in the course of the orthodontic treatment, and thus increase overall efficiency and effectiveness of the orthodontic treatment.

More specifically, in accordance with a first broad aspect of the present technology, there is provided a method of determining a cut line of an aligner. The method is executable by a processor of a computer system. The method comprises: obtaining, by the processor, 3D model data of a subject's arch form, the subject's arch form including a plurality of teeth and a gingiva of a subject; obtaining, by the processor, using the 3D model data, for each one of the plurality of teeth, a respective one of a plurality of individual intersection loops, a given one of the plurality of individual intersection loops being indicative of a boundary between a given one of the plurality of teeth and the gingiva; segmenting, by the processor, based on a predetermined rule, each one of the plurality of individual intersection loops into a buccal portion and a lingual portion; sequentially joining, by the processor, respective buccal portions and respective lingual portions associated with each one of the plurality of individual intersection loops, thereby generating a single arch form loop; smoothing, by the processor, the single arch form loop, thereby generating a smoothed single arch form loop; and determining, by the processor, the cut line of the aligner as the smoothed single arch, the cut line is to be used for producing the aligner.

In some implementations of the method, the segmenting comprises segmenting each one of the plurality of individual intersection loops into the buccal portion, the lingual portion, a mesial portion, and a distal portion. However, in some implementations of the method, if a given one of the plurality of individual segmentation loops is associated with a most distal one of the plurality of teeth, the method comprises segmenting the given one of the plurality of individual segmentation loops into a first portion and a second portion, wherein the first portion is a respective mesial portion; and the second portion includes a respective lingual portion, a respective distal portion, and a respective buccal portion of the given one of the plurality of individual segmentation loops.

In some implementations of the method, the method further comprises, prior to the segmenting each one of the plurality of individual segmentation loops, translating each one of the plurality of individual intersection loops along a respective tooth in a direction of a crown portion thereof at a predetermined distance, thereby generating a plurality of offset individual intersection loops; and generating the single arch form based on the plurality of offset individual segmentation loops.

In some implementations of the method, translating a given one of the plurality of individual segmentation loops associated with a respective tooth, comprises: identifying, by the processor, based on the 3D model data, points defining the given one of the plurality of individual segmentation loops; determining, by the processor, at a given one of the points, a respective normal vector associated with the given one of the plurality of individual segmentation loops, the respective normal vector being directed to the crown portion of the respective tooth; determining, by the processor, at the given one of the points, a respective tooth inward normal vector, the respective tooth inward normal vector being directed inwardly in the crown portion of the respective tooth and perpendicular to the respective normal vector; determining, by the processor, at the given one of the points, a respective reference plane defined by an intersection between the respective normal vector and the respective tooth inward normal vector; generating, by the processor, in the respective reference plane, a respective one of a plurality of reference circles originating in the given one of the points defining the given one of the plurality of individual segmentation loops, each one of the plurality of reference circles being of a reference radius having a value of the predetermined distance; and determining, by the processor, a respective intersection point of a plurality of intersection points between each one of the plurality of reference circles with the crown portion of the respective tooth; generating, by the processor, based on the plurality of intersection points, a respective offset individual intersection loop of the plurality of offset individual intersection loops.

In some implementations of the method, the method further comprises identifying, by the processor, points defining the given one of the plurality of individual segmentation loops; normalizing, by the processor, the points along the given one of the plurality of individual intersection loops, the normalizing comprising redistributing the points within the given one of the plurality of individual intersection loops uniformly, equalizing distances therebetween.

In some implementations of the method, the redistributing is executed with a predetermined step indicative of a distance between the points along the given one of the plurality of individual intersection loops.

In some implementations of the method, the method further comprises obtaining, for a first tooth of the plurality of teeth: at least one bridge between the first tooth and a second tooth adjacent thereto, the at least one bridge being representative of a surface extending in a mesiodistal direction between the first tooth and the second tooth, and filling in an interdental gap therebetween; and wherein: segmenting a first one of the plurality of the plurality of individual segmentation loops associated with the first tooth comprising identifying, by the processor, a respective lingual portion and a respective buccal portion thereof based at least on the at least one bridge associated therewith.

In some implementations of the method, joining respective buccal portions and respective lingual portions of the first one of the plurality of individual segmentation loops and a second one of the plurality of individual segmentation loops, associated with the second tooth, comprises joining the respective buccal portions and the respective lingual portions along respective lines extending therebetween along the at least one bridge.

In some implementations of the method, the smoothing the single arch form loop further comprises applying, by the processor, a smoothing algorithm thereto.

In some implementations of the method, the smoothing the single arch form loop further comprises normalizing a plurality of single arch form loop points defining the single arch form loop, the normalizing comprising: identifying, within the plurality of single arch form loop points, dense point clusters, the dense point clusters including single arch form loop points having point density therein higher than a predetermined point density threshold value; and excluding the dense point clusters from a plurality of smoothed single arch form loop points defining the smoothed single arch form loop.

In some implementations of the method, the identifying the dense point clusters comprises: determining, within a predetermined neighborhood of a given one of the plurality of single arch form loop points, a number of single arch form loop points encompassed therein; in response to the number of single arch form loop points being lower than a predetermined number threshold value indicative of the predetermined point density threshold value, including the given one of the single arch form loop points in the plurality of smoothed single arch form loop points; in response to the number of single arch form loop points being equal to or greater than the predetermined number threshold value, excluding the given one of the single arch form loop points from the plurality of smoothed single arch form loop points.

In some implementations of the method, the method further comprises applying, by the processor, the smoothed arch form loop on the unfinished aligner or to an unfinished aligner model to indicate the cut line thereon to be used for producing the aligner.

In some implementations of the method, the applying the smoothed single arch form loop to the unfinished aligner or to the unfinished aligner model comprises projecting each point of the smoothed single arch form loop onto a closest respective point of a surface of the unfinished aligner or the unfinished aligner model.

In some implementations of the method, the method further comprises causing a laser cutting system to cut the unfinished aligner along the cut line or the smoothed single arch form loop to produce the aligner for the subject.

In some implementations of the method, the laser cutting system comprises a camera, and the method further comprising the processor obtaining image data from the camera to detect the cut line or the smoothed single arch form loop prior to causing the cutting therealong.

In some implementations of the method, the method further comprises causing a 3D printer to produce the aligner based on the cut line or the smoothed single arch form loop.

In some implementations of the method, the method further comprises determining, by the processor, each one of the plurality of individual segmentation loops, the determining comprising analyzing, based on the 3D model data, a spatial curvature of a respective one of the plurality of teeth. For example, the determining may be executed by determining, based on the spatial curvature of the respective one of the plurality of teeth, a probability that a given point along a boundary between the respective one of the plurality of teeth and the gingiva is indicative of the respective individual segmentation loop.

In accordance with a second broad aspect of the present technology, there is provided a system for determining an orthodontic treatment for a subject based on determining a cut line of an aligner. The system comprises: a processor and a non-transitory computer-readable medium comprising instructions. The processor, upon executing the instructions, is configured to: obtain 3D model data of a subject's arch form, the subject's arch form including a plurality of teeth and a gingiva of a subject; obtain, using the 3D model data, for each one of the plurality of teeth, a respective one of a plurality of individual intersection loops, given one of the plurality of individual intersection loops being indicative of a boundary between a given one of the plurality of teeth and the gingiva; segment, based on a predetermined rule, each one of the plurality of individual intersection loops into a buccal portion and a lingual portion; sequentially join, respective buccal portions and respective lingual portions associated with each one of the plurality of individual intersection loops, thereby generating a single arch form loop; smooth the single arch form loop, thereby generating a smoothed single arch form loop; and determine the cut line of the aligner as the smoothed single arch form loop, the cut line is to be used for producing the aligner.

In some implementations of the system, the processor is configured to segment each one of the plurality of individual intersection loops into the buccal portion, the lingual portion, a mesial portion, and a distal portion. However, in some implementations of the system, if a given one of the plurality of individual segmentation loops is associated with a most distal one of the plurality of teeth, the processor is further configured to segment the given one of the plurality of individual segmentation loops into a first portion and a second portion, wherein the first portion is a respective mesial portion; and the second portion includes a respective lingual portion, a respective distal portion, and a respective buccal portion of the given one of the plurality of individual segmentation loops.

In some implementations of the system, prior to the segmenting each one of the plurality of individual segmentation loops, the processor is further configured to translate each one of the plurality of individual intersection loops along a respective tooth in a direction of a crown portion thereof at a predetermined distance, thereby generating a plurality of offset individual intersection loops; and generate the single arch form based on the plurality of offset individual segmentation loops.

In some implementations of the system, in order to translate a given one of the plurality of individual segmentation loops associated with a respective tooth, the processor is further configured to: identify, based on the 3D model data, points defining the given one of the plurality of individual segmentation loops; determine, at a given one of the points, a respective normal vector associated with the given one of the plurality of individual segmentation loops, the respective normal vector being directed to the crown portion of the respective tooth; determine, at the given one of the points, a respective tooth inward normal vector, the respective tooth inward normal vector being directed inwardly in the crown portion of the respective tooth and perpendicular to the respective normal vector; determine, at the given one of the points, a respective reference plane defined by an intersection between the respective normal vector and the respective tooth inward normal vector; generate, in the respective reference plane, a respective one of a plurality of reference circles originating in the given one of the points defining the given one of the plurality of individual segmentation loops, each one of the plurality of reference circles being of a reference radius having a value of the predetermined distance; and determine a respective intersection point of a plurality of intersection points between each one of the plurality of reference circles with the crown portion of the respective tooth; generate, based on the plurality of intersection points, a respective offset individual intersection loop of the plurality of offset individual intersection loops.

In some implementations of the system, the processor is further configured to: identify points defining the given one of the plurality of individual segmentation loops; normalize the points along the given one of the plurality of individual intersection loops by redistributing the points within the given one of the plurality of individual intersection loops uniformly, equalizing distances therebetween.

In some implementations of the system, the redistributing is executed with a predetermined step indicative of a distance between the points along the given one of the plurality of individual intersection loops.

In some implementations of the system, the processor is further configured to obtain, for a first tooth of the plurality of teeth: at least one bridge between the first tooth and a second tooth adjacent thereto, the at least one bridge being representative of a surface extending in a mesiodistal direction between the first tooth and the second tooth, and filling in an interdental gap therebetween; and wherein: in order to segment a first one of the plurality of the plurality of individual segmentation loops associated with the first tooth, the processor is further configured to identify a respective lingual portion and a respective buccal portion thereof based at least on the at least one bridge associated therewith.

In some implementations of the system, to join respective buccal portions and respective lingual portions of the first one of the plurality of individual segmentation loops and a second one of the plurality of individual segmentation loops, associated with the second tooth, the processor is further configured to join the respective buccal portions and the respective lingual portions along respective lines extending therebetween along the at least one bridge.

In some implementations of the system, the processor, configured to smooth the single arch form loop, is further configured to apply a smoothing algorithm thereto.

In some implementations of the system, the processor, configured to smooth the single arch form loop, is further configured to normalize a plurality of single arch form loop points defining the single arch form loop, by: identifying, within the plurality of single arch form loop points, dense point clusters, the dense point clusters including single arch form loop points having point density therein higher than a predetermined point density threshold value; and excluding the dense point clusters from a plurality of smoothed single arch form loop points defining the smoothed single arch form loop.

In some implementations of the system, the identifying the dense point clusters comprises: determining, within a predetermined neighborhood of a given one of the plurality of single arch form loop points, a number of single arch form loop points encompassed therein; in response to the number of single arch form loop points being lower than a predetermined number threshold value indicative of the predetermined point density threshold value, including the given one of the single arch form loop points in the plurality of smoothed single arch form loop points; in response to the number of single arch form loop points being equal to or greater than the predetermined number threshold value, excluding the given one of the single arch form loop points from the plurality of smoothed single arch form loop points.

In some implementations of the system, the processor, configured to cause applying the smoothed single arch form loop to the unfinished aligner, is further configured to cause projecting each point of the smoothed single arch form loop onto a closest respective point of a surface of the unfinished aligner.

In some implementations of the system, the system further comprises a laser cutting system communicatively coupled with the processor, and the processor is further configured to cause the laser cutting system to cut the unfinished aligner along the smoothed single arch form loop to produce the aligner for the subject.

In some implementations of the system, the laser cutting system comprises a camera, and the processor is further configured to cause the camera to detect the smoothed single arch form loop prior to cutting therealong.

In some implementations of the system, the processor is further configured to cause producing the aligner based on the smoothed single arch form loop using 3D printing techniques.

In some implementations of the system, the processor is further configured to apply the smoothed single arch form loop to an unfinished aligner to indicate the cut line on the unfinished aligner for producing the aligner.

In some implementations of the system, the processor is further configured to determine each one of the plurality of individual segmentation loops, by analyzing, based on the 3D model data, a spatial curvature of a respective one of the plurality of teeth.

In accordance with a third broad aspect of the present technology, there is provided a method of determining an open edge of an aligner. The method is executable by a processor of a computer system. The method comprises: obtaining, by the processor, 3D model data of an aligner mold associated with a subject's arch form, the subject's arch form including a plurality of teeth and a gingiva of a subject; obtaining, by the processor, using the 3D model data, for each one of the plurality of teeth, a respective one of a plurality of individual intersection loops, a given one of the plurality of individual intersection loops being indicative of a boundary between a given one of the plurality of teeth and the gingiva; segmenting, by the processor, based on a predetermined rule, each one of the plurality of individual intersection loops into a buccal portion and a lingual portion; sequentially joining, by the processor, respective buccal portions and respective lingual portions associated with each one of the plurality of individual intersection loops, thereby generating a single arch form loop; smoothing, by the processor, the single arch form loop, thereby generating a smoothed single arch form loop; and determining, by the processor, the open edge of the aligner as the smoothed single arch form loop.

In some implementations of the method, the segmenting comprises segmenting each one of the plurality of individual intersection loops into the buccal portion, the lingual portion, a mesial portion, and a distal portion. However, in some implementations of the method, if a given one of the plurality of individual segmentation loops is associated with a most distal one of the plurality of teeth, the method comprises segmenting the given one of the plurality of individual segmentation loops into a first portion and a second portion, wherein the first portion is a respective mesial portion, and the second portion includes a respective lingual portion, a respective distal portion, and a respective buccal portion of the given one of the plurality of individual segmentation loops.

In some implementations of the method, the method further comprises producing the aligner based at least on the smoothed single arch form loop, using 3D printing techniques.

Further, in the context of the present specification, the term "interdental filler model" refers to a 3D representation of a specific surface generated within an interdental space between a given pair of adjacent teeth. More specifically, a given interdental filler model may extend from a distal surface of one of the given pair of adjacent teeth to a mesial surface of an other one of the given pair of adjacent teeth filling in the interdental space therebetween.

In the context of the present specification, the term "orthodontic treatment" is broadly referred to as any type of medical intervention aimed at correcting malocclusions associated with the subject's teeth, including surgical and non-surgical manipulations, such as, but not limited to, using aligners. Further, the orthodontic treatment, as referred to herein, may be determined by a professional practitioner in the field of dentistry (such as an orthodontist, a maxillofacial surgeon, for example), or automatically by a specific software, based on respective image data and input parameters associated with the subject.

Further, in the context of the present specification, the term "cut line" is a representation of an edge of an aligner, at an open end thereof, or a line along which the edge of the aligner will be formed once an unfinished aligner is cut along the line.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale.

DETAILED DESCRIPTION

Certain aspects and embodiments of the present technology are directed to methods of and systems for determining a cut line of an aligner and producing the aligner from an unfinished aligner based on the cut line.

More specifically, certain aspects and embodiments of the present technology comprise a computer-implemented method of determining the cut line; applying the cut line onto the preform; and causing cutting the preform along the cut line, thereby forming the aligner.

Certain embodiments of the present technology minimize, reduce or avoid some of the problems noted with the prior art. For example, by implementing certain embodiments of the current technology in respect of determining the cut line, one or more of the following advantages may be obtained: (1) a shape of the aligner corresponding more closely to an actual intraoral anatomy of the subject due to determining the cut line based on individual segmentation loops associated with crowns of the subject's teeth; and (2) an improved comfort of using the aligner in the course of an associated orthodontic treatment due to considering interdental spaces (also referred to herein as "interdental gaps") when determining the cut line. Thus, methods and systems provided herein, according to certain non-limiting embodiments of the present technology, allow achieving stable manufacture accuracy of the aligner and better adherence of the subject to the orthodontic treatment, which consequently, may translate into increased efficacy of the orthodontic treatment.

Orthodontic Treatment

Figure 1:
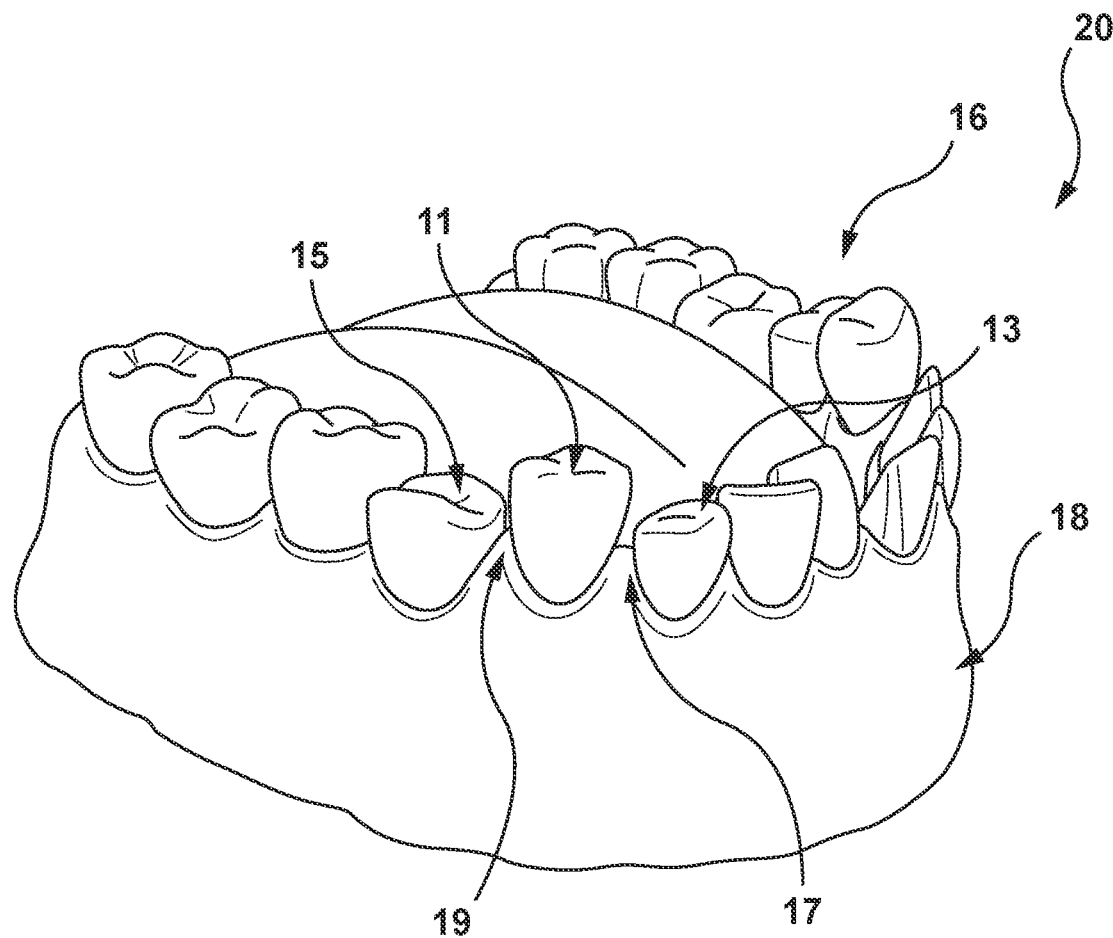
FIG. 1 depicts a perspective view of a lower arch form of a subject exemplifying a misalignment of some of subject's teeth, in accordance with certain non-limiting embodiments of the present technology.

Referring initially to FIG. 1, there is depicted a perspective view of a lower arch form 20 of the subject, to which certain aspects and non-limiting embodiments of the present technology may be applied.

As can be appreciated, the lower arch form 20 includes lower teeth 16 and a lower gingiva 18. Further, in the depicted embodiments of FIG. 1, at least, a first tooth 11, a second tooth 13, and a third tooth 15 are misaligned within the lower arch form 20.

Also, as may be appreciated from FIG. 1, the first tooth 11 and the second tooth 13 form a first interdental space 17 therebetween; and the first tooth 11 and the third tooth 15 form a second interdental space 19 therebetween. For example, a given one of the first interdental space 17 and the second interdental space 19 may be an independent orthodontic disorder, such as excessive spacing between respective ones of the lower teeth 16. In another example, the given one of the first interdental space 17 and second interdental space 19 may be formed as a result of a tooth loss followed by crowding of teeth therearound.

Thus, for resolving the present orthodontic disorders of the lower teeth 16, an orthodontic treatment may be provided to the subject.

In accordance with certain non-limiting embodiments of the present technology, the orthodontic treatment may comprise applying an orthodontic device. Generally speaking, the orthodontic device may be configured to exert a respective predetermined force onto at least one of the first tooth 11, the second tooth 13, and the third tooth 15 causing them to move towards an aligned position, that is, the position associated with normal occlusion between the lower teeth 16 and upper teeth (not depicted) of the subject. More specifically, in the depicted embodiments of FIG. 1, the orthodontic device may be configured to cause the first tooth 11 to move outwardly between the second tooth 13 and the third tooth 15; and further cause intrusion thereof in tissues of the lower gingiva 18. Further, the orthodontic device may be configured to cause the second tooth 13 to rotate clockwise around its tooth axis, and to cause the third tooth 15 to move inwardly relative to the lower arch form 20. In various non-limiting embodiments of the present technology, the orthodontic device may comprise orthodontic appliances of different types, shapes, sizes and configurations, such as those including, without limitation, aligners, brackets, multi-strand wires, strips, retainers, and plates.

Figure 2A:
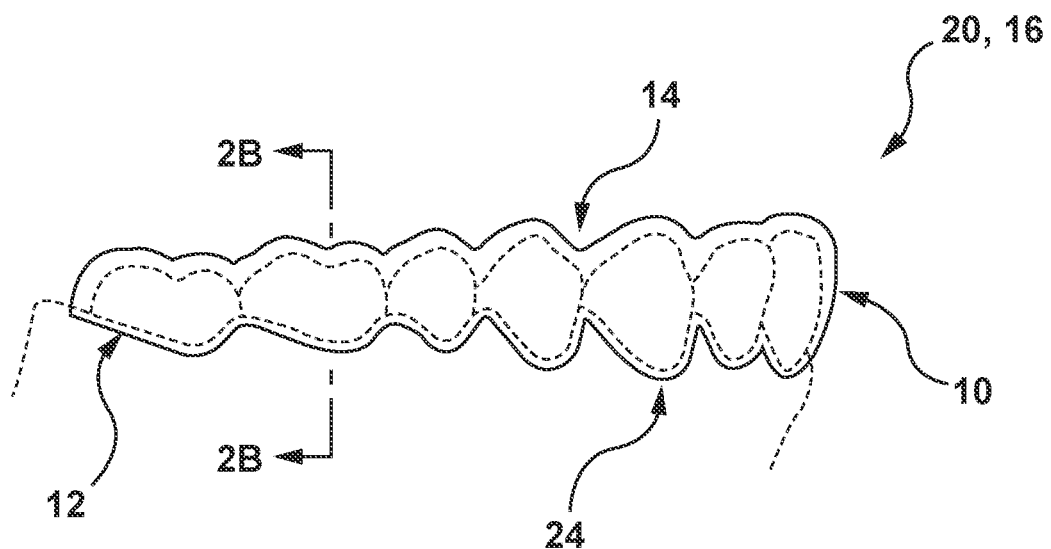
FIGS. 2A and 2B depict side and cross-sectional views, respectively, of a dental appliance applied to the subject's teeth that may be configured to treat the misalignment of the subject's teeth present in FIG. 1, in accordance with certain non-limiting embodiments of the present technology.
Figure 2B:
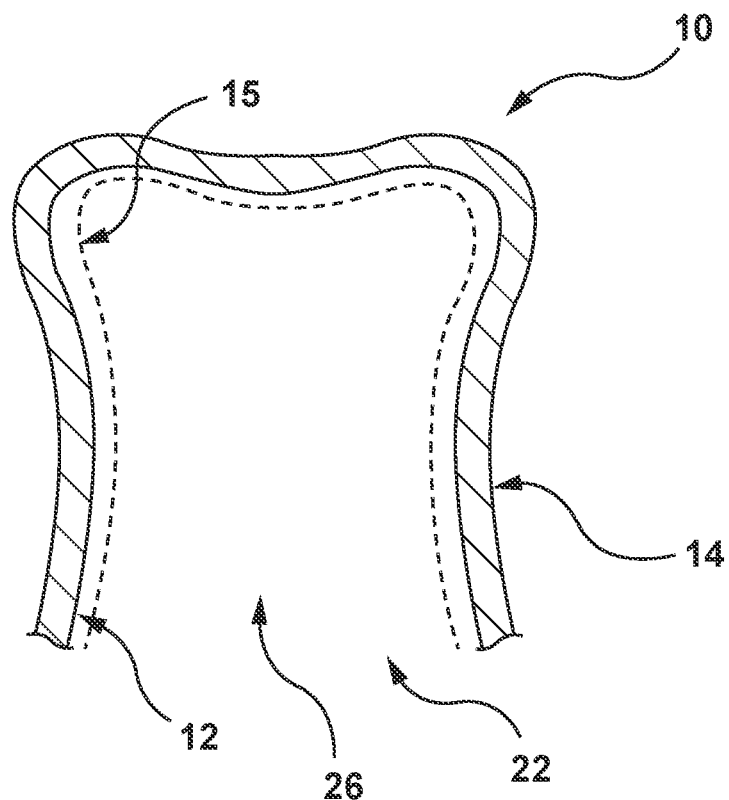

In specific non-limiting embodiments of the present the present technology, the orthodontic device may include an aligner. With reference to FIGS. 2A and 2B, there is depicted an aligner 10 applied to at least some of the lower teeth 16, in accordance with certain non-limiting embodiments of the present technology. The aligner 10 comprises an inner surface 12 and an outer surface 14. The inner surface 12 defines a channel 26, which is configured, in some non-limiting embodiments of the present technology, for receiving crown portions of at least some of the lower teeth 16 including the first tooth 11, the second tooth 13, and the third tooth 15. However, in other non-limiting embodiments of the present technology, the channel 26 of the aligner 10 may be configured to receive crown portions of all of the lower teeth 16. At least one edge (also referred to herein as an "open edge", defined by a cut line 304 depicted in FIG. 3, for example) of the channel 26 is shaped for following a gum line 22 along the lower gingiva 18.

It is appreciated that, in accordance with certain non-limiting embodiments of the present technology, the aligner 10 may be used for treating different types of teeth misalignment or malocclusion, including but not limited to one or more of: closing interdental spaces ("space closure"), creating/widening interdental spaces, tooth rotation, tooth intrusion/extrusion, and tooth translation, to name a few. It should further be noted that in certain non-limiting embodiments of the present technology, applying the aligner 10 to the lower teeth 16 may further include applying specific attachments (also known as "fixing blocks") thereto.

As it may become apparent, the aligner 10 may be designed in such a way that its inner surface 12 is configured to impose respective forces on one or more of the lower teeth 16 to obtain a desired position of the lower teeth 16 at a given stage of the orthodontic treatment.

Needles to say that, although in the depicted embodiments of FIGS. 2A and 2B, the aligner 10 is configured to be applied onto the lower teeth 16, in other non-limiting embodiments of the present technology, a respective configuration of the aligner 10 may be applied to the upper teeth (not depicted) of the subject for conducting the orthodontic treatment of respective malocclusion disorders.

According to certain non-limiting embodiments of the present technology, the aligner 10 may be made of a polymer, such as a thermoplastic material. In other non-limiting embodiments of the present technology, the aligner 10 may be made of poly-vinyl chloride (PVC). In yet other non-limiting embodiments of the present technology, the aligner 10 may be made of polyethylene terephthalate glycol (PETG). Other suitable materials can also be used to form the aligner 10.

In some non-limiting embodiments of the present technology, the aligner 10 may be manufactured using additive manufacturing techniques, such as 3D printing techniques where the aligner 10 is formed through printing according to a pre-generated 3D representation thereof.

However, in other non-limiting embodiments of the present technology, the aligner 10 may be produced by a thermoforming process where (1) an unfinished aligner is produced, using a preform, on a respective aligner mold (not depicted) associated with a respective stage of the orthodontic treatment, which is configured to shape the inner surface 12 of the aligner 10; and (2) the unfinished aligner is cut along the cut line 304 to remove excess material therefrom, thereby producing the aligner 10, the cut line defining the at least one edge of the channel of the aligner.

Figure 3:
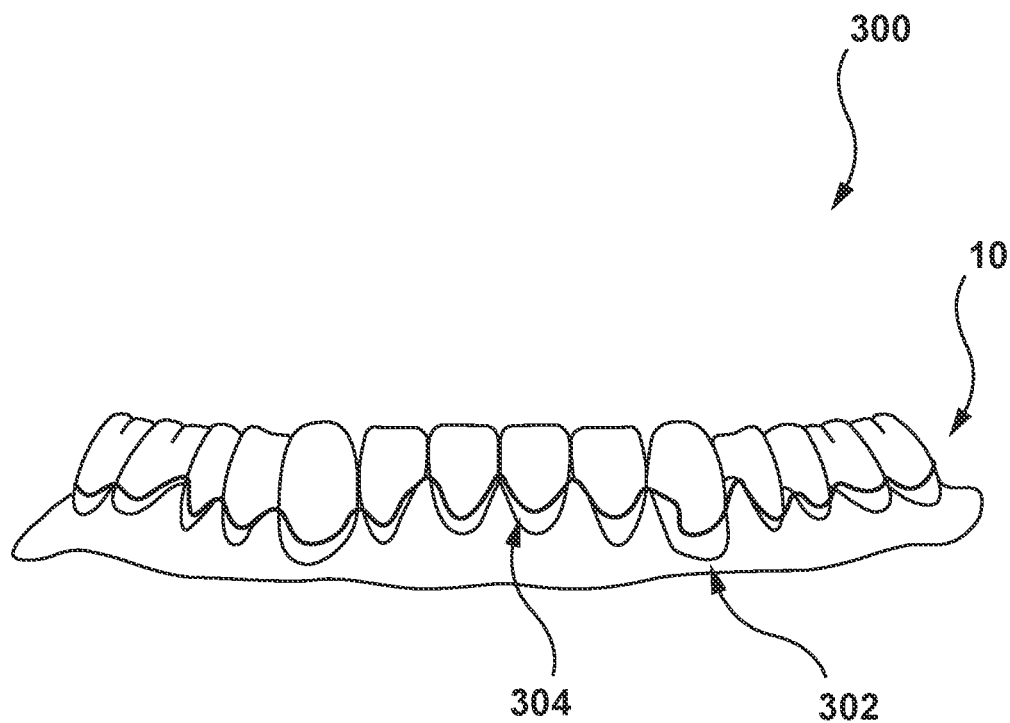
FIG. 3 depicts a panoramic view of an unfinished dental appliance with a cut line applied thereon used for manufacturing the dental appliance present in FIGS. 2A and 2B, in accordance with certain non-limiting embodiments of the present technology.

With reference to FIG. 3, there is depicted an example configuration of an unfinished aligner 300 used for producing the aligner 10, in accordance with certain non-limiting embodiments of the present technology.

As it can be appreciated from FIG. 3, the unfinished aligner 300 includes an excess portion 302 formed as an artefact after the thermoforming, which thus needs to be removed in order to produce the aligner 10, the aligner 10 comprising an upper portion (in the orientation of FIG. 3) of the unfinished aligner 300. For example, according to certain non-limiting embodiments of the present technology, the unfinished aligner 300 may be trimmed by a cutting device along the cut line 304, as will be described below.

However, in order to form the aligner 10 of a desired shape, that is, corresponding to a respective stage of the orthodontic treatment, the cut line 304 should be accurately determined to consider the gum line and/or actual spatial curvature of crown portions (not separately labelled) of the lower teeth 16. Further, referring back to FIG. 1, when determining the cut line 304, the first interdental space 17 and the second interdental space 19 should also be considered. For example, as it can be appreciated from FIG. 1, both the first interdental space 17 and the second interdental space 19 are inclined relative to the first tooth 11, which should be taken into account when determining the cut line 304 as failing to consider these inclinations may result in the aligner 10, when it is worn over the lower teeth 16, coming in contact with the lower gingiva 18 in the regions adjacent to at least one of the first interdental space 17 and the second interdental space 19.

This may result in certain undesired effects of the orthodontic treatment, such as pressure on the lower gingiva 18 causing damage thereof in the contact regions with the aligner 10, which eventually may affect subject's adherence to wearing the aligner 10. Consequently, such undesired effects of the orthodontic treatment may further affect the effectiveness thereof.

Thus, certain non-limiting embodiments of the methods and systems described herein are directed to determining the cut line 304, which may include: (1) receiving a 3D representation of the lower arch form 20 including a representation of the lower teeth 16 and the lower gingiva 18; (2) receiving, individual segmentation loops associated with the 3D representation of the lower arch form 20, the individual segmentation loops being indicative of boundary lines between each one of the lower teeth 16 and the lower gingiva 18; and (3) joining each one of the individual segmentation loops across interdental spaces between adjacent ones of the lower teeth 16, if any, such as the first interdental space 17 and the second interdental space 19, thereby generating a single arch form loop of the lower arch form 20 defining the cut line 304. Optionally, the single arch form loop is offset from the lower gingiva 18 in a direction of the crown portions of the lower teeth 16. The so-determined cut line 304 may thus define the open edge of the channel 26 of the aligner 10. How the single arch form loop can be generated based on the 3D representation of the lower arch form 20 of the subject, in accordance with certain non-limiting embodiments of the present technology, will be described below with reference to FIGS. 6 to 11.

System

Figure 4:
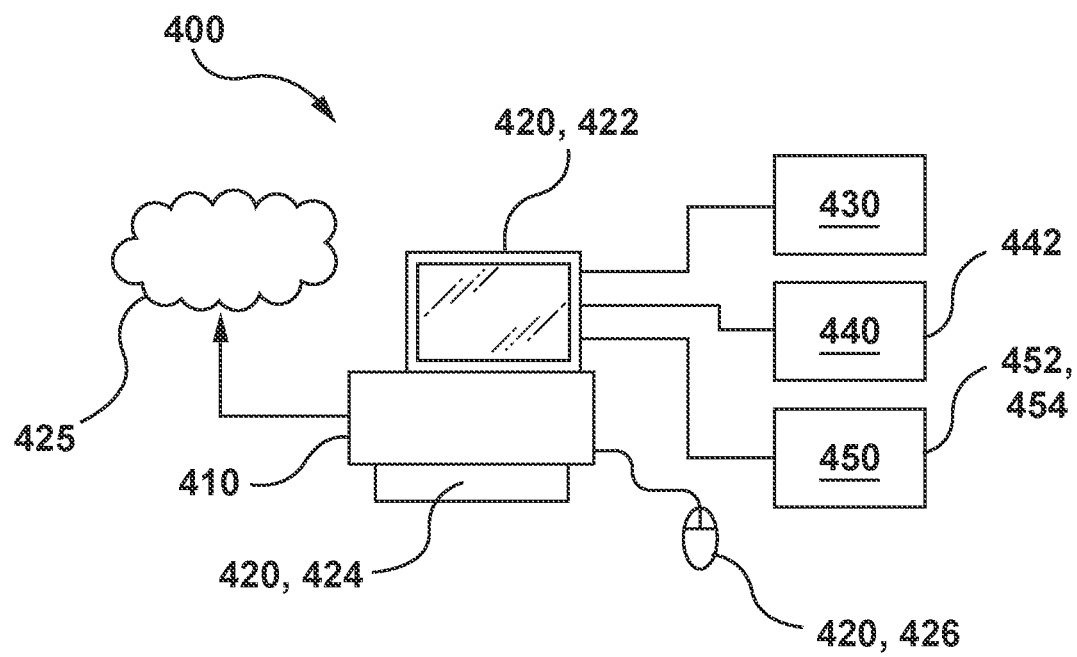
FIG. 4 depicts a schematic diagram of a system for determining the cut line depicted in FIG. 3 used for manufacturing the dental appliance of FIGS. 2A and 2B, in accordance with certain embodiments of the present technology.
Figure 5:
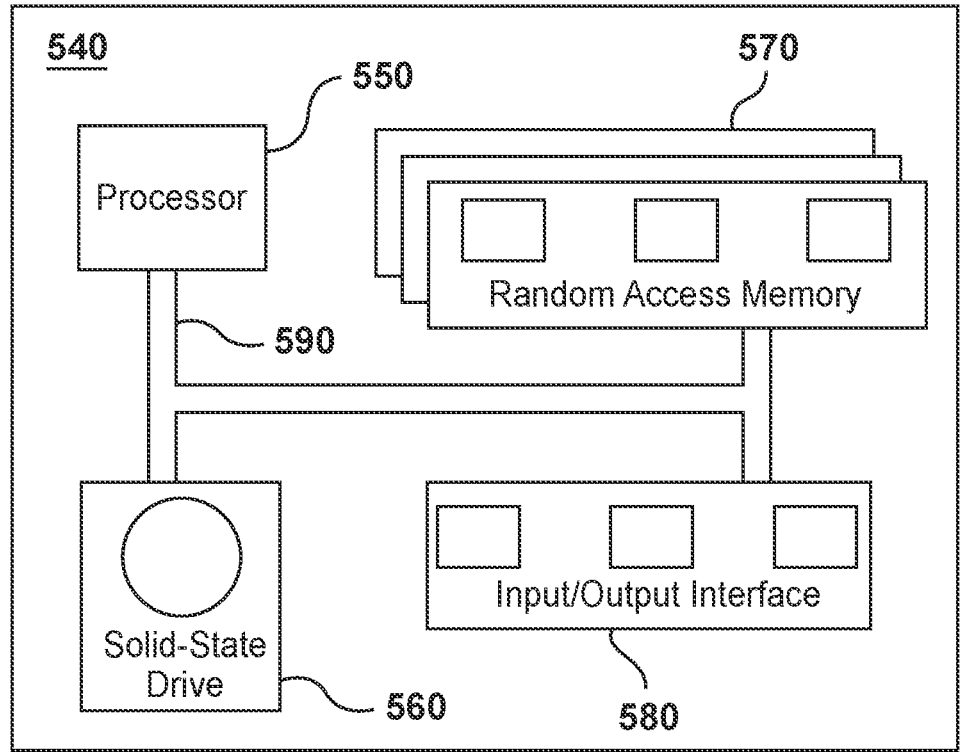
FIG. 5 depicts a schematic diagram of a computing environment of the system of FIG. 4, in accordance with certain embodiments of the present technology.

Referring to FIGS. 4 and 5, there is depicted a schematic diagram of a system 400 suitable for determining the cut line 304 for producing the aligner 10, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to determine, based on image data associated with the subject, the cut line 304 for producing the aligner 10. In additional non-limiting embodiments of the present technology, the computer system 410 may further be configured to cause applying the cut line 304 onto the unfinished aligner 300 and cause cutting, by the cutting device, the unfinished aligner 300, thereby forming the aligner 10 used for implementing the orthodontic treatment. In other non-limiting embodiments of the present technology, the computer system 410 may further be configured to cause cutting, by the cutting device, the unfinished aligner 300 along the cut line 304, thereby forming the aligner 10 used for implementing the orthodontic treatment.

To that end, in some non-limiting embodiments of the present technology, the computer system 410 is configured to receive image data pertaining to the subject or to a given stage of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

For example, in some non-limiting embodiments of the present technology, the system 400 may be configured to receive image data indicative of the lower arch form 20, such as an arch form 3D representation of the lower arch form 20. In specific non-limiting embodiments of the present technology, the system 400 (for example, by a processor 550 depicted in FIG. 5) may be configured to determine the orthodontic treatment based on the arch form 3D representation of the lower arch form 20 representative of the actual configuration thereof as described in a co-owned U.S. patent application Ser. No. 17/014,107 filed on Sep. 8, 2020, and entitled "SYSTEMS AND METHODS FOR DETERMINING A TOOTH TRAJECTORY"; a content of which is hereby incorporated by reference in its entirety. Further, in some non-limiting embodiments of the present technology, based on the so-determined orthodontic treatment, an aligner mold 3D representation of the aligner mold (not depicted) indicative of the given configuration of the lower arch form 20 may be produced, which may further be used for producing the unfinished aligner 300.

In alternative non-limiting embodiments of the present technology, the computer system 410 may be configured to receive the image data associated with the subject directly from an imaging device 430 communicatively coupled thereto. Broadly speaking the imaging device 430 may be configured (for example, by the processor 550 depicted in FIG. 5) to capture and/or process the image data of the lower teeth 16 and the periodontium (not depicted) of the subject. In certain non-limiting embodiments of the present technology, the image data may include, for example, one or more of (1) images of external surfaces of respective crown portions of the lower teeth 16, (2) images of an external surface of the periodontium including those of the lower gingiva 18, the alveolar mandibular bone (not depicted), and images of superficial blood vessels and nerve pathways associated with the lower teeth 16; and (3) images of an oral region. By doing so, the imaging device 430 may be configured, for example, to capture image data of the lower arch form 20 of the subject. In another example, the imaging device may also be configured to capture and/or process image data of an upper arch form (not depicted) associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device 430 may comprise a desktop scanner enabling to digitize the aligner mold (not depicted) of the aligner 10 associated with the respective stage of the orthodontic treatment for the lower arch form 20, thereby generating the aligner mold 3D representation. In this regard, the aligner mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from DENTAL WINGS, INC. of 2251, ave Letourneux, Montréal (QC), Canada, H1V 2N9. It should be expressly understood that the desktop scanner can be implemented in any other suitable equipment.

In some non-limiting embodiments of the present technology, the imaging device 430 may comprise an intraoral scanner enabling to capture direct optical impressions of the actual configuration of the lower arch form 20 of the subject.

In a specific non-limiting example, the intraoral scanner can be of one of the types available from MEDIT, CORP. of 23 Goryeodae-ro 22-gil, Seongbuk-gu, Seoul, South Korea. It should be expressly understood that the intraoral scanner can be implemented in any other suitable equipment.

Further, it is contemplated that the computer system 410 may be configured for processing of the received image data. The resulting image data of the lower arch form 20 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 410 may further comprise a corresponding computing environment.

Further, in certain non-limiting embodiments of the present technology, the system 400 may be configured to physically mark the cut line 304 on the unfinished aligner 300. To that end, the system 400 may further comprise a marking subsystem 440. It is not limited how the marking subsystem 440 may be implemented; however, in various non-limiting embodiments of the present technology, the marking subsystem 440 may include a marking head 442 for applying the cut line 304 onto the unfinished aligner 300 and a first robotic arm (not depicted) for holding and manipulating the unfinished aligner 300 around the marking head 442. In some non-limiting embodiments of the present technology, the marking head 442 may further comprise a coloring material storage (not depicted) for storing a coloring material (such as ink, as an example) and a supply control block (not depicted). In some non-limiting embodiments of the present technology, the marking head 442 may be implemented as a laser apparatus configurable to scorch the cut line 304 on the unfinished aligner 300.

In certain non-limiting embodiments of the present technology, the system 400 may further be configured to detect the cut line 304 applied on the unfinished aligner 300 and cut along the cut line to produce the aligner 10. In this regard, the system 400 may further comprise a forming subsystem 450. In some non-limiting embodiments of the present technology, the forming subsystem 450 may include a second robotic arm (not depicted), at an end-effector of which there is installed a camera device 452. In some non-limiting embodiments of the present technology, the camera device 452 can be any appropriate digital camera configured to detect the cut line 304 applied by the marking subsystem 440 described above onto the unfinished aligner 300, including, for example, but not limited to, a coupled-charged device camera (a CCD camera). Further, as mentioned above, the forming subsystem 450 may include the cutting device 454. Non limiting examples of the cutting device 454 may include a laser-based cutting device, a mechanical cutting device such as using a blade with a rotary or linear cutting action, and a water-jet based cutting device, as an example.

In some non-limiting embodiments of the present technology, both the marking subsystem 440 and the forming subsystem 450 of the system 400 may be implemented as described in a co-owned U.S. patent application Ser. No. 16/704,718 filed on Dec. 5, 2019, entitled "SYSTEMS AND METHODS FOR FORMING PERSONALIZED DENTAL APPLIANCES", the content of which is hereby incorporated by reference in its entirety Thus, the forming subsystem 450 may be configured to: (1) cause the camera device 452 to move around the unfinished aligner 300 with the cut line 304 applied thereon to detect the cut line 304 and generating respective image data thereof; (2) receive the image data of the cut line 304; and (3) based on the received image data of the cut line 304, cause cutting, by the cutting device 454 the unfinished aligner 300 along the cut line 304, thereby forming the aligner 10.

In other non-limiting embodiments of the present technology, the forming subsystem 450 may be configured for cutting the unfinished aligner 300 without requiring detection of the cut line 304. Instead the determined cut line 304 is used to guide the cutting—for example, based on received data indicative of a position of the cut line 304 within the unfinished aligner 300. In some non-limiting embodiments of the present technology, the data indicative of the position of the cut line 304 within the unfinished aligner 300 may include at least one of: Cartesian coordinates; angular data indicative of a cutting angle for cutting the unfinished aligner 300; and a distance form the cutting device 454, as an example.

Further, with reference to FIG. 5, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random access memory 570 and an input/output interface 580. Communication between the various components of the computing environment 540 may be enabled by one or more internal and/or external buses 590 (e.g. a PCI bus, universal serial bus, IEEE 1394 "Firewire" bus, SCSI bus, Serial-ATA bus, ARINC bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 560 stores program instructions suitable for being loaded into the random access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (i.e. an "off the shelf" generic computer system). The generic computer system may be a desktop computer/personal computer, but may also be any other type of electronic device such as, but not limited to, a laptop, a mobile device, a smart phone, a tablet device, or a server.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the interface device 420 being in communication with the input/output interface 580. In the embodiment of FIG. 4, the interface device is a screen 422. In other non-limiting embodiments of the present technology, the interface device 420 may be a monitor, a speaker, a printer or any other device for providing an output in any form such as an image form, a written form, a printed form, a verbal form, a 3D model form, or the like.

In the depicted embodiments of FIG. 4, the interface device 420 also comprises a keyboard 424 and a mouse 426 for receiving input from the user of the system 400. Other interface devices 420 for providing an input to the computer system 410 can include, without limitation, a USB port, a microphone, a camera or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Image Data

As alluded to above, according to certain non-limiting embodiments of the present technology, the processor 550 may be configured to: (1) receive image data indicative of the lower teeth 16; (2) determine, based on the image data, the cut line 304; (3) cause a cutting device to cut the unfinished aligner 300 along the cut line 304, thereby forming the aligner 10 with the open edge defined by the cut line; or (3) apply the cut line 304 to an aligner mold 3D representation to represent the edge of the aligner in the aligner mold 3D representation.

Figure 6:
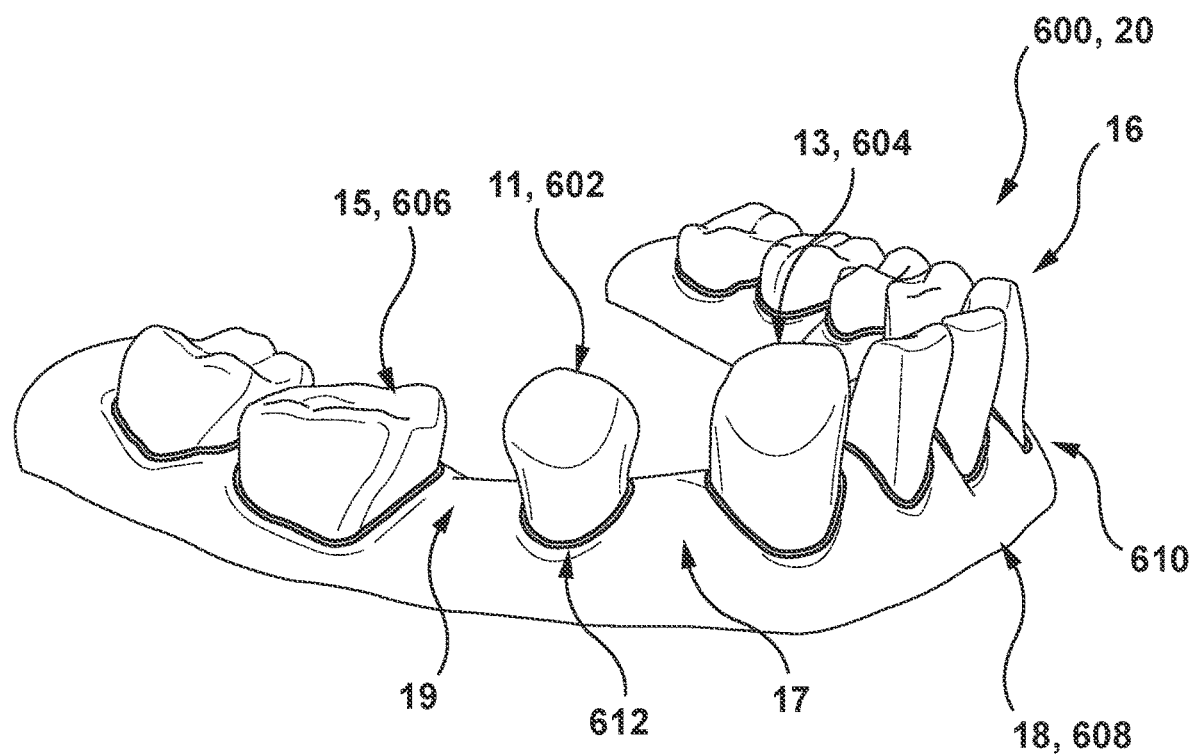
FIG. 6 depicts a 3D model of the lower arch form used for determining the cut line depicted in FIG. 3 and used for manufacturing the dental appliance of FIGS. 2A and 2B, the 3D model including a plurality of individual segmentation loops indicative of an intersection between each one of the subject's teeth and a subject's gingiva used for determining the cut line of FIG. 3, in accordance with certain non-limiting embodiments of the present technology.

With reference to FIG. 6, there is depicted a perspective view of an arch form 3D representation 600 of the lower arch form 20, in accordance with certain non-limiting embodiments of the present technology.

According to certain non-limiting embodiments of the present technology, the arch form 3D representation 600 may comprise tooth 3D representations of the lower teeth 16, such as a first tooth 3D representation 602, a second tooth 3D representation 604, and a third tooth 3D representation 606 respectively associated with the first tooth 11, the second tooth 13, and the third tooth 15; and a gingiva 3D representation 608 of the lower gingiva 18.

It should be expressly understood that, although the description herein below will be given in respect of the lower arch form 20 of the subject (and associated therewith the lower teeth 16 and the lower gingiva 18) for the sake of clarity and simplicity thereof, and in no way as a limitation, the non-limiting embodiments of the present technology can also apply to the upper teeth of the upper arch form (not separately depicted) with certain alterations, which will be explicitly indicated below where necessary.

Further, in accordance with certain non-limiting embodiments of the present technology, the processor 550 may be configured to generate the arch form 3D representation 600 comprising a plurality of mesh elements representative of respective surfaces of the lower arch form 20. In certain non-limiting embodiments of the present technology, the plurality of mesh elements may be represented, without limitation, by triangular mesh elements, quadrilateral mesh elements, convex polygonal mesh elements, or even concave polygonal mesh elements, as an example, without departing from the scope of the present technology.

Further, in some non-limiting embodiments of the present technology, the processor 550 may be further configured to obtain at least one of a plurality of individual segmentation loops 610. According to certain non-limiting embodiments of the present technology, each one the plurality of individual segmentation loops 610 may be indicative of closed intersection contour (boundary) between a respective one of the lower teeth 16 and the lower gingiva 18—for example, a first individual segmentation loop 612 segmenting the first tooth 3D representation 602 from the gingiva 3D representation 608.

In some non-limiting embodiments of the present technology, the processor 550 may be configured to obtain the first individual segmentation loop 612 having been previously generated by third-party software, based on the arch form 3D representation 600, and data indicative thereof may have been stored in a data format receivable by the processor 550, for example, via the input/output interface 580.

In other non-limiting embodiments of the present technology, the first individual segmentation loop 612 may be generated manually, for example, by a practicing clinician involved in the developing the orthodontic treatment. For example, the practicing clinician may manually apply the plurality of individual segmentation loops 610 onto the arch form 3D representation 600, using respective suitable software, and the processor 550 may further be configured to receive the arch form 3D representation 600, and detect the first individual segmentation loop 612 applied thereon.

In specific non-limiting embodiments of the present technology, the processor 550 may be configured to determine first individual segmentation loop 612 based on analyzing spatial curvature of the first tooth 3D representation 602 and that of the gingiva 3D representation 608. More specifically, in this regard, the processor 550 may be configured to apply one of the approaches described in a co-owned U.S. Pat. No. 10,695,147-B1 issued on Jun. 30, 2020, entitled "METHOD AND SYSTEM FOR DENTAL BOUNDARY DETERMINATION"; the content of which is hereby incorporated by reference in its entirety.

More specifically, according to certain non-limiting embodiments of the present technology, in order to determine the first individual segmentation loop 612, the processor 550 may be configured to: (i) receive the arch form 3D representation 600 associated with the lower arch form 20; (ii) define, around the first tooth 3D representation 602, a first individual segmentation loop prototype around it of the first individual segmentation loop 612; (iii) for each vertex of a plurality of vertices of the first individual segmentation loop prototype, determine an indication of curvature thereof; (iv) determine, based on the indication of curvature corresponding to the respective vertex, a predicted likelihood parameter for each vertex of the plurality of vertices, wherein the predicted likelihood parameter may indicate a predicted likelihood that a respective vertex corresponds to the first individual segmentation loop 612 between the first tooth 11 and the lower gingiva 18; and (v) use the predicted likelihood parameter of the respective vertices to select the vertices defining the first individual segmentation loop 612.

According to certain non-limiting embodiments of the present technology, the processor 550 may further be configured to join each one of the plurality of individual segmentation loops 610 in a sequential manner to generate the cut line 304. According to some non-limiting embodiments of the present technology, the processor may be configured to join the plurality of individual segmentation loops 610 over the gingiva 3D representation 608—that is, through interdental spaces formed between at least some of adjacent ones of the lower teeth 16, such the first interdental space 17 and the second interdental space 19.

How the joining can be implemented, in accordance with certain non-limiting embodiments of then present technology, will now be described with reference to FIGS. 7 to 10.

Determining the Cut Line

According to certain non-limiting embodiments of the present technology, in order to determine the cut line 304 based on the plurality of individual segmentation loops 610, the processor 550 may be configured to translate each one thereof along a respective tooth 3D representation associated with the lower teeth 16 in a direction of associated crown portions.

To that end, according to certain non-limiting embodiments of the present technology, first, the processor 550 may be configured to identify, based on the arch form 3D representation 600, vertices defining a given one of the plurality of individual segmentation loops 610—such as the first individual segmentation loop 612, and normalize vertices thereof for further processing.

In some non-limiting embodiments of the present technology, the processor 550 may be configured to normalize the vertices of the first individual segmentation loop 612 by redistributing the vertices along the first individual segmentation loop 612 uniformly, equalizing distances therebetween. In some non-limiting embodiments of the present technology, the processor 550 may be configured to equalize the distances between the vertices with a predetermined step, which thus may be followed by the processor 550 removing some of the vertices that did not fit the first individual segmentation loop 612 after normalization. Generally speaking, the predetermined step may be associated with computational capacity of the processor 550, and in some non-limiting embodiments of the present technology, the predetermined step may be 0.2 mm; however, in other non-limiting embodiments of the present technology, the predetermined step may be, for example, 0.05 mm, 0.1 mm, 0.3 mm, 0.5 mm, etc.

Further, after the normalizing, in some non-limiting embodiments of the present technology, the processor 550 may be configured to translate each vertex of the first individual segmentation loop 612 upwardly (in the orientation of FIG. 6) along a surface of the first tooth 3D representation 602, elevating them above the gingiva 3D representation 608.

It should be expressly understood that it is not limited how the processor 550 is configured to translate the first individual segmentation loop 612, which may include, for example, linear displacing each of its vertices along the first tooth 3D representation 602 at a predetermined distance; however, according to certain non-limiting embodiments of the present technology, the processor 550 may be configured to displace a given one of the vertices defining the first tooth 3D representation 602 along a circle originating therein, thereby determining a respective offset vertex as at an intersection of the circle and the first tooth 3D representation 602.

Figure 7A:
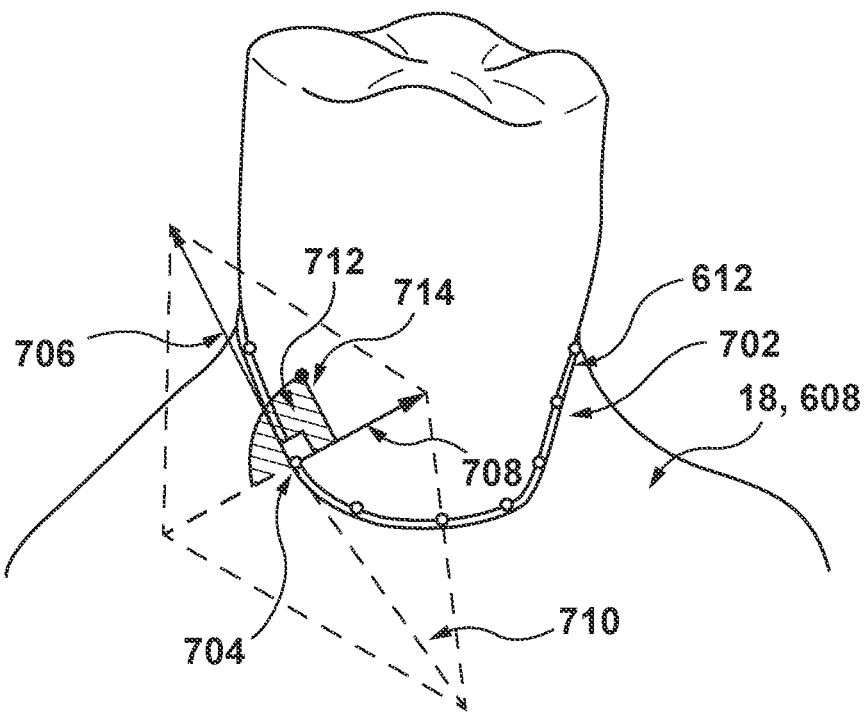
FIGS. 7A to 7C depict a step for translating, by a processor of FIG. 5, each one the plurality of individual segmentation loops along the 3D model of FIG. 6 in a direction of associated crown portions thereof, in accordance with certain non-limiting embodiments of the present technology.
Figure 7B:
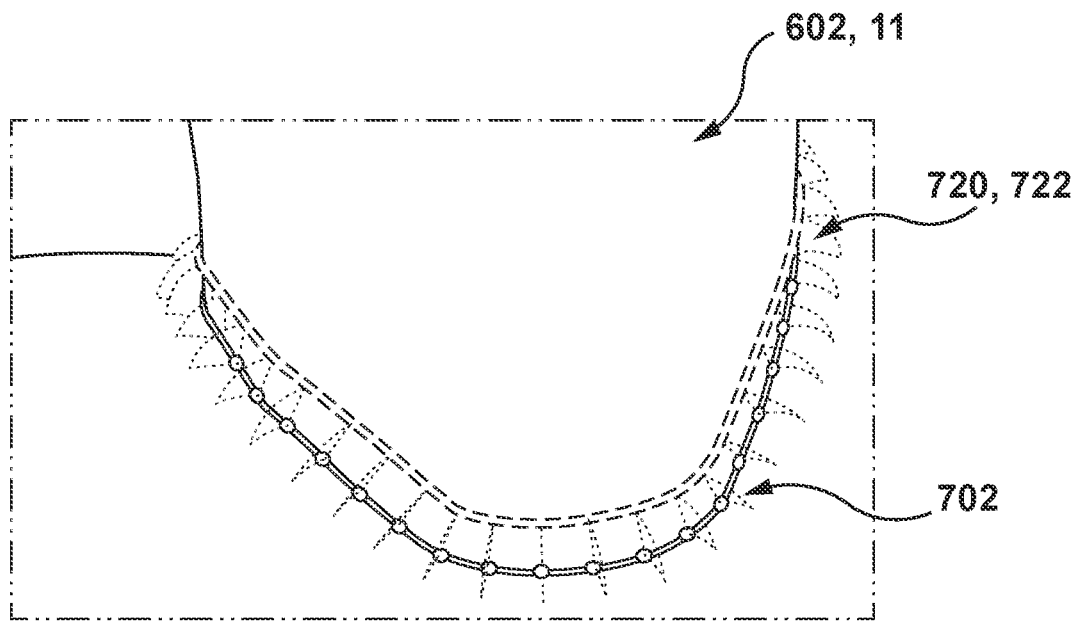

With reference to FIGS. 7A and 7B, there is depicted a schematic diagram of a step for displacing a first plurality of vertices 702 defining the first individual segmentation loop 612 along the first tooth 3D representation 602, in accordance with certain non-limiting embodiments of the present technology.

According to certain non-limiting embodiments of the present technology, first, the processor 550 may be configured to generate a reference plane 710 dissecting the first tooth 3D representation 602.

For example, in some non-limiting embodiments of the present technology, the processor 550 may be configured to generate the reference plane 710 based on an intersection of normal vectors to the first individual segmentation loop 612 at a given vertex 704 of the first plurality of vertices 702. Thus, in some non-limiting embodiments of the present technology, the processor 550 may be configured to determine, at the given vertex 704, a first normal vector 706 to the first individual segmentation loop 612, which is directed to an occlusal surface of a crown portion of the first tooth 3D representation 602. Further, the processor 550 may be configured to determine, at the given vertex 704, a second normal vector 708 to the first individual segmentation loop 612, which is directed inwardly in the crown portion of the first tooth 3D representation 602 and is perpendicular to the first normal vector 706.

Further, based on an intersection of the first normal vector 706 and the second normal vector 708, the processor 550 may be configured to generate the reference plane 710 dissecting the first tooth 3D representation 602.

Further, the processor 550 may be configured to generate, within the reference plane 710, a reference circle 712 originating in the given vertex 704 of the first plurality of vertices 702. Finally, in some non-limiting embodiments of the present technology, the processor 550 may be configured to identify an intersection point between the reference circle 712 and the first tooth 3D representation 602, thereby determining a respective offset vertex 714.

As it may be appreciated, a translation distance from the given vertex 704 to the respective offset vertex 714 depends on a radius of the reference circle 712, which may vary in various non-limiting embodiments, without limitation, from around 0.2 mm to around 5 mm, as an example. Thus, as will become apparent from the description provided herein below, according to certain non-limiting embodiments of the present technology, the radius of the reference circle 712 associated with the given vertex 704 may be indicative of a curvature of the cut line 304 at the respective offset vertex 714.

Thus, by applying the approach to determining the respective offset vertex 714 described above to other ones of the first plurality of vertices 702, the processor 550 may further be configured to determine a first offset plurality of vertices 720 defining a first offset individual segmentation loop 722, depicted in FIG. 7B, in accordance with certain non-limiting embodiments of the present technology.

It should be expressly understood that, in some non-limiting embodiments of the present technology, the processor 550 may be configured to generate, at each one of the first plurality of vertices 702, respective reference circles of a same radius, thereby preserving an original curvature of the first individual segmentation loop 612 in the first offset individual segmentation loop 722. However, in other non-limiting embodiments of the present technology, the processor 550 may be configured to generate the respective reference circles of different radii, thereby modulating a curvature of the first offset individual segmentation loop 722 at least at some of the first offset plurality of vertices 720 based, for example, on anatomical specifics of the first tooth 11, such as chippings or cracks of the crown portion thereof; or considering use of other orthodontic devices, along with the aligner 10, such as an attachment for the first tooth 11, for example.

Figure 7C:
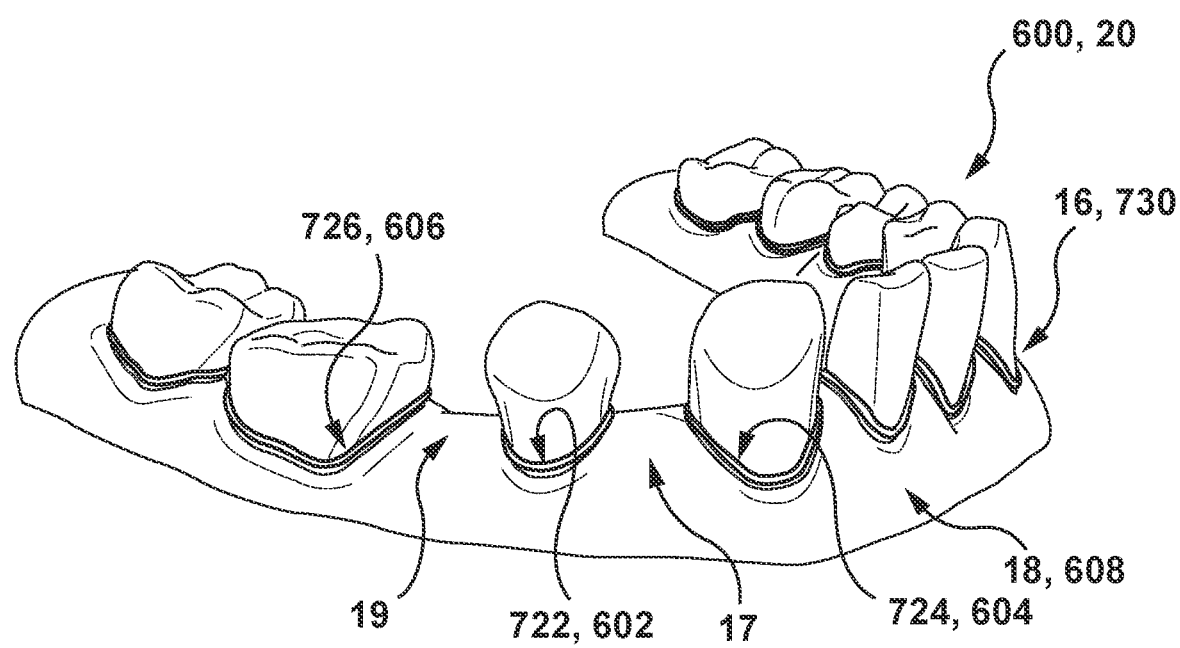

Accordingly, by determining a respective offset individual segmentation loop for each one of the tooth 3D representation of the lower teeth 16 as described above, the processor 550 may be configured to generate a plurality of offset individual segmentation loops 730 depicted, in accordance with certain non-limiting embodiments of the present technology, in FIG. 7C.

As will become apparent from the description provided herein below, according to certain non-limiting embodiments of the present technology, the processor 550 may be configured to generate each one of the plurality of offset individual segmentation loops 730 —such as the first offset individual segmentation loop 722 of the first tooth 3D representation 602, a second offset individual segmentation loop 724 of the second tooth 3D representation 604, and a third offset individual segmentation loop 726 of the third tooth 3D representation 606 in such a way further allowing sequentially joining them without intersecting the gingiva 3D representation 608 within the first interdental space 17 and the second interdental space 19, respectively.

Further, as it may be appreciated from FIG. 3, as the cut line 304 mostly extends along a buccal side and a lingual side of the lower arch form 20, for determining the cut line 304, each one of the plurality of offset individual segmentation loops 730 needs to be segmented at least in two portions—a respective buccal portion and a respective lingual portion thereof. How the processor 550 can be configured to segment each one of the plurality of offset individual segmentation loops 730, in accordance with certain non-limiting embodiments of the present technology, will now be described with reference to FIGS. 8A and 8B.

Figure 8A:
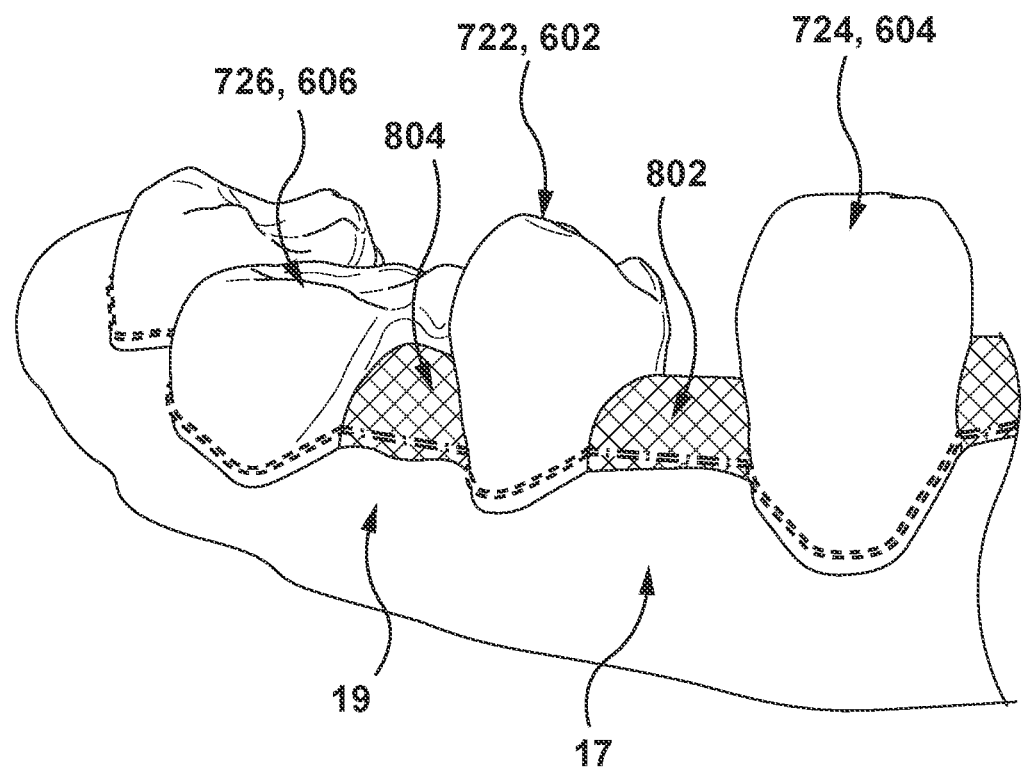
FIGS. 8A to 8C depict a step for segmenting, by the processor of FIG. 5, each one of the translated plurality of individual segmentation loops of FIG. 7C using interdental filler models, thereby further generating a single arch form loop, according to certain embodiments of the present technology.

With reference to FIG. 8A, there is depicted a portion of the arch form 3D representation 600 including the first tooth 3D representation 602, the second tooth 3D representation 604, and the third tooth 3D representation 606 with a first interdental filler model 802 and a second interdental filler model 804 generated therebetween by the processor 550, in accordance with certain non-limiting embodiments of the present technology.

In the context of the present specification, a given interdental filler model, such as the first interdental filler model 802, denotes a surface extending between the first tooth 3D representation 602 and the second tooth 3D representation 604 in a mesiodistal direction, thereby filling in the first interdental space 17. According to certain non-limiting embodiments of the present technology, the first interdental filler model 802 may have an arch-like profile in a linguolabial section thereof grounded in the gingiva 3D representation 608 within the first interdental space 17.

Further, in some non-limiting embodiments of the present technology, the processor 550 may be further configured to obtain the first interdental filler model 802. For example, the first interdental filler model 802 may be generated by third-party software based on the arch form 3D representation 600 including the plurality of individual segmentation loops 610 and stored in a data format receivable by the processor 550.

However, in other non-limiting embodiments of the present technology, the processor 550 may be configured to determine the first interdental filler model 802 by applying one or more approaches described in the co-owned U.S. patent application Ser. No. 17/143,033, filed concurrently with the present application, and entitled "METHOD AND SYSTEM FOR GENERATING INTERDENTAL FILLER MODELS"; the content of which is hereby incorporated by reference in its entirety.

More specifically, in certain non-limiting embodiments of the present technology, in order to determine the first interdental filler model 802, the processor 550 may be configured to: (i) receive the arch form 3D representation 600 including the plurality of individual segmentation loops 610; (ii) determine locations for ends of the first interdental filler model 802 between the first tooth 3D representation 602 and the second tooth 3D representation 604 by: determining a first vertex on a tooth axis associated with first tooth 3D representation 602, and determining a second vertex on a tooth axis of the second tooth 3D representation 604; (iii) determine a curvature of the first interdental filler model 802 by: determining a first arc connecting the first vertex to the second vertex; (iv) determine a shape of the first interdental filler model 802 by: determining a second arc having a center at the first vertex, determining a third arc having a center at the second vertex, and interpolating a set of arcs between the second arc and the third arc, wherein a center of each arc in the set of arcs corresponds to a vertex on the first arc; (v) ground the first interdental filler model 802 on the gingiva 3D representation 608 by: extending each arc of the set of arcs to end on a ground surface; and (vi) generate the first interdental filler model 802 by: connecting free ends of each arc of the set of arcs, thereby forming a set of sections, lofting each section of the set of sections, and forming the first interdental filler model 802 based on the set of sections.

Accordingly, the processor 550 may be configured to use the approach described above to generate the first interdental filler model 802 for generating respective interdental filler models within interdental spaces between other adjacent ones of the lower teeth 16. For example, the processor 550 may be configured to generate the second interdental filler model 804 filling in the second interdental space 19. By so doing, the processor 550 may be configured to generate a plurality of interdental filler models (not separately labelled) associated with the arch form 3D representation 600. Thus, in some non-limiting embodiments of the present technology, the processor 550 may be configured to use the arch form 3D representation 600 including the plurality of interdental filler models for producing a corresponding configuration of the unfinished aligner 300.

Figure 8B:
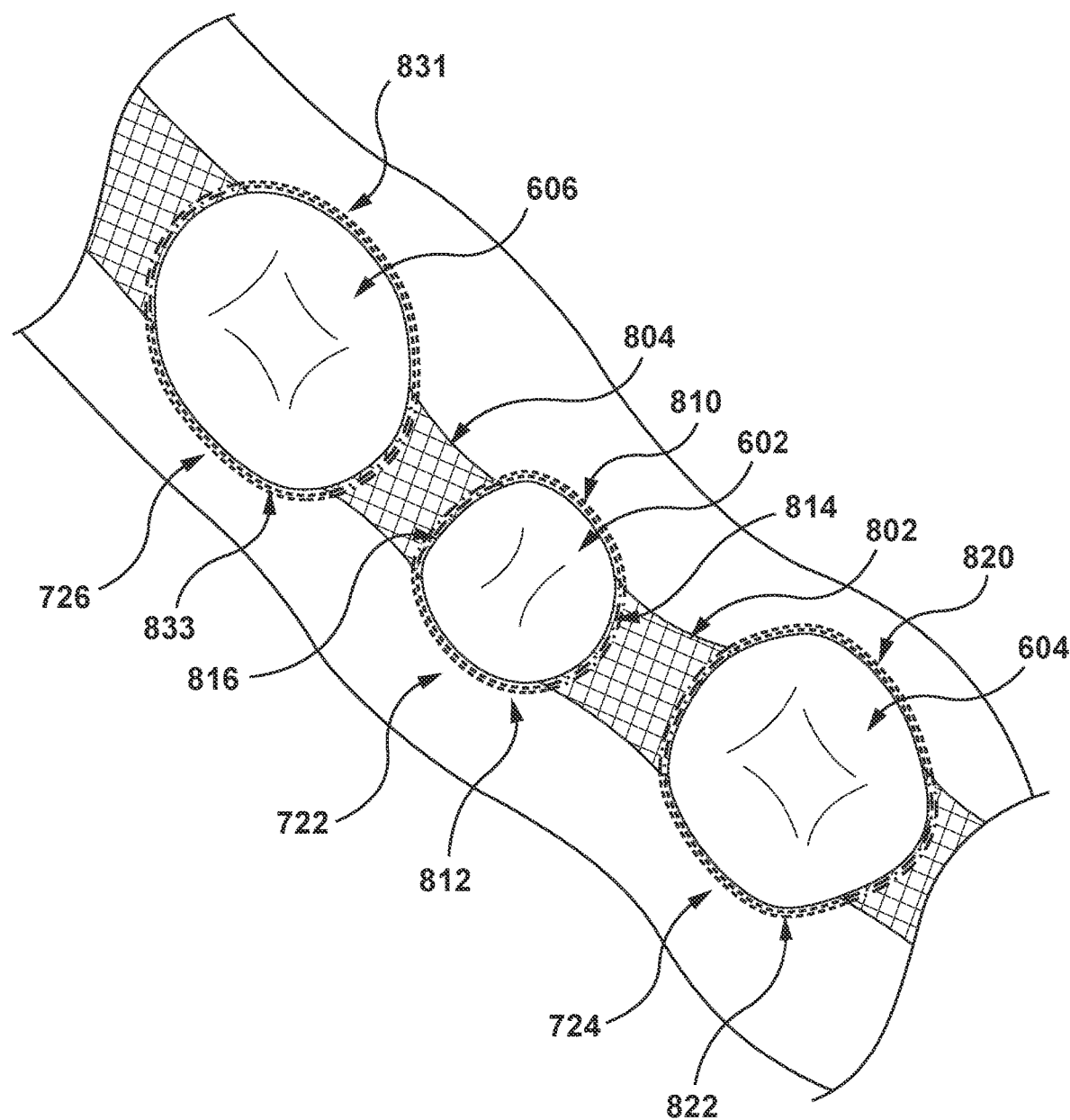

Further, having obtained the first interdental filler model 802 and the second interdental filler model 804, the processor 550 may thus be configured to segment the first offset individual segmentation loop 722, as depicted in FIG. 8B depicting a planar view of the portion of the arch form 3D representation 600 of FIG. 8A, in accordance with certain non-limiting embodiments of the present technology. For example, in some non-limiting embodiments of the present technology, the processor 550 may be configured to segment the first offset individual segmentation loop 722 into a first lingual portion 810, a first buccal portion 812, a first mesial portion 814, and a first distal portion 816. As it can be appreciated, the first offset individual segmentation loop 722 is segmented, such that the first mesial portion 814 and the first distal portion 816 thereof are encompassed within a respective one of the first interdental filler model 802 and the second interdental filler model 804, whereas the first lingual portion 810 and the first buccal portion 812 thereof are left outside either one of the first interdental filler model 802 and the second interdental filler model 804. In other words, by using the first interdental filler model 802 and the second interdental filler model 804, the processor 550 may be configured to cut out the first mesial portion 814 and the first distal portion 816 of the first offset individual segmentation loop 722, leaving only the first lingual portion 810 and the first buccal portion 812 thereof.

Further, the processor 550 may be configured to determine, in a similar fashion, respective lingual portions and respective buccal portions of other ones of the plurality of offset individual segmentation loops 730—such as a second lingual portion 820 and a second buccal portion 822 of the second offset individual segmentation loop 724; and a third lingual portion 831 and a third buccal portion 833 of the third offset individual segmentation loop 726.

As certain non-limiting embodiments of the present technology are directed to determining the cut line 304 as a closed loop extending around tooth 3D representations of the arch form 3D representation 600, the processor 550 may be configured not to generate respective interdental filler models adjacent to distal surfaces of those tooth 3D representations associated with most distal ones of the lower teeth 16. Thus, respective distal portions of associated ones of the plurality of offset individual segmentation loops 730 would not be cut out; and as such, could form part of the cut line 304.

Finally, according to certain non-limiting embodiments of the present technology, for determining the cut line 304, the processor 550 may be configured to join respective lingual portions and respective buccal portions of the plurality of offset individual segmentation loops 730 in a sequential manner around all tooth 3D representations of the lower teeth 16.

In some non-limiting embodiments of the present technology, the processor 550 may be configured to join end vertices of the respective lingual portions and the respective buccal portions by linear segments (not depicted) along surfaces of respective interdental filler models therebetween—such as the first buccal portion 812 joined with the second buccal portion 822 and the third buccal portion 833, as depicted in FIG. 8A, as an example. However, it should be expressly understood that segments of various curvatures and shapes are also envisioned including, without limitation: spline segments, Bezier curve segments, zig-zag segments, and the like, without departing from the scope of the present technology.

Figure 8C:
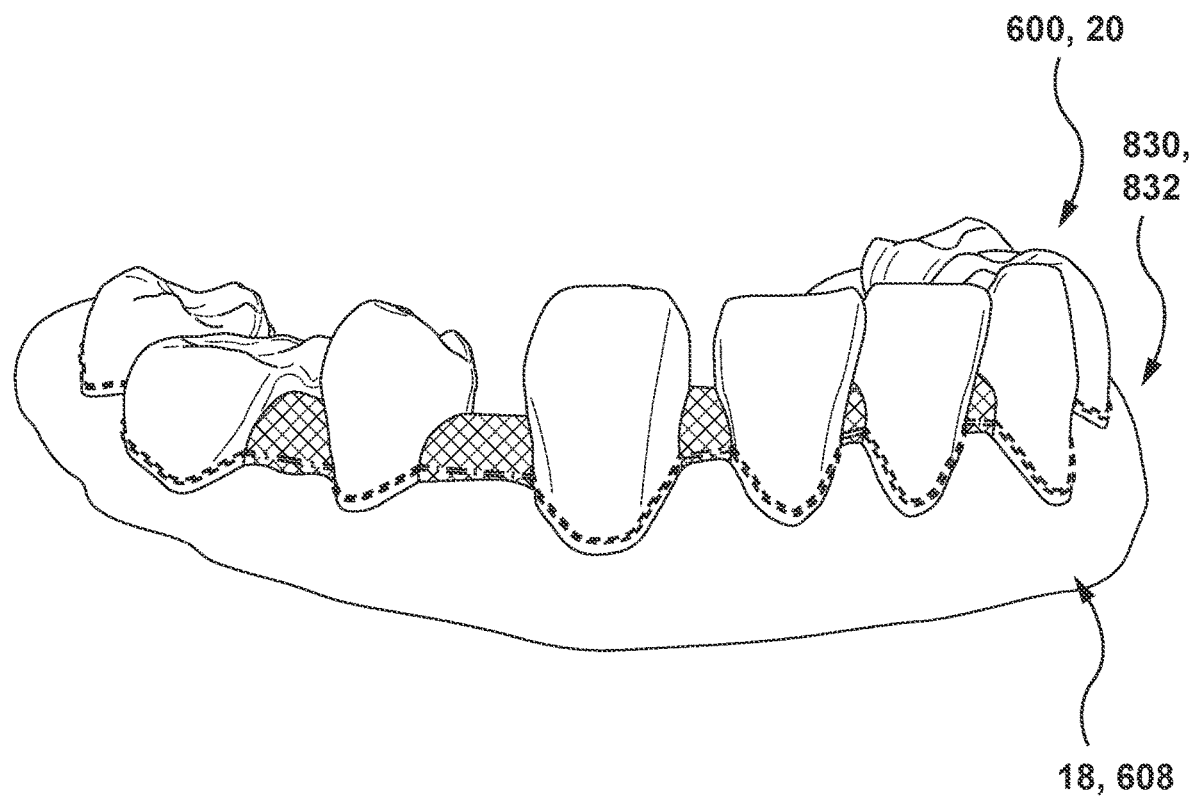

Thus, by sequentially joining the respective lingual portions and the respective buccal portions of the plurality of offset individual segmentation loops 730, the processor 550 may be configured to generate a single arch form loop 830 depicted in FIG. 8C, in accordance with certain non-limiting embodiments of the present technology.

Further, in additional non-limiting embodiments of the present technology, the processor 550 may be configured to identify a plurality of single arch form loop vertices 832 defining the single arch form loop 830 and redistribute them uniformly within the single arch form loop 830 in a fashion similar to that describe above in respect of normalizing the vertices of the first individual segmentation loop 612.

In accordance with certain non-limiting embodiments of the present technology, the processor 550 may further be configured to use the single arch form loop 830 to determine the cut line 304.

However, in some non-limiting embodiments of the present technology, the single arch form loop 830 may include sharp kinks caused by abrupt junctions between some of the plurality of interdental filler models and respective tooth 3D representations of the arch form 3D representation 600. Thus, the aligner 10 produced based on the cut line 304 determined as the single arch form loop 830 may cause inconveniences to the subject, such as excessive pressure to some of the lower teeth 16 in the regions associated with the abrupt junctions.

Figure 9A:
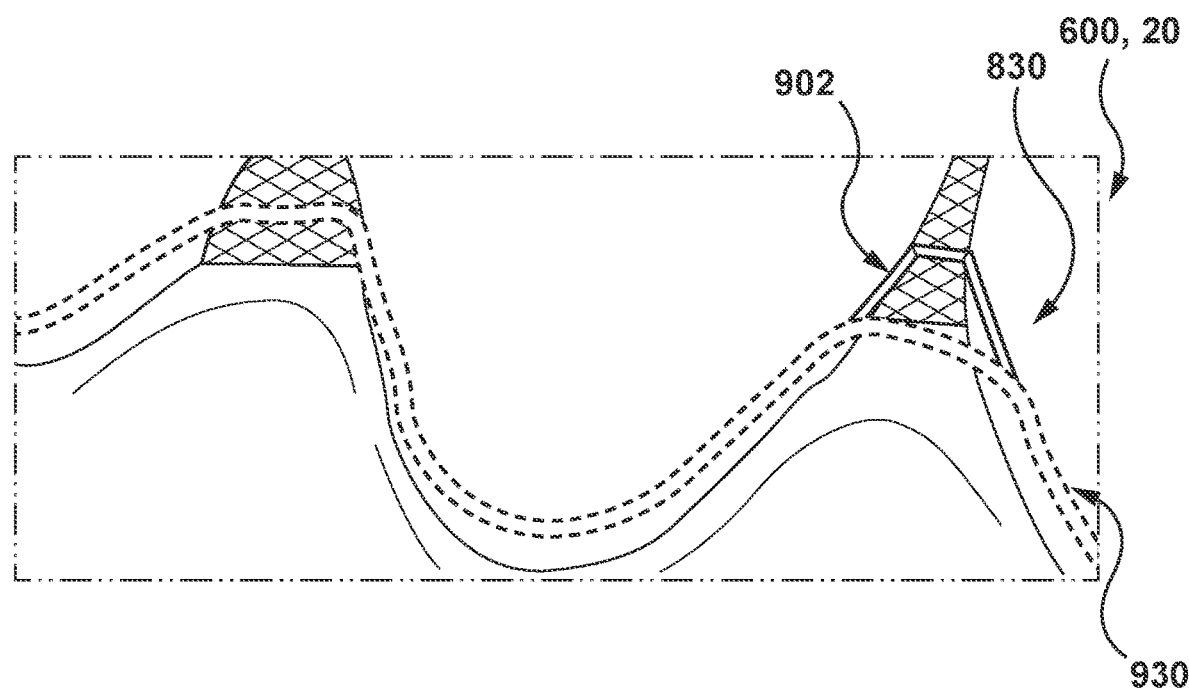
FIGS. 9A and 9B depict a step for smoothing, by the processor of FIG. 5, the single arch form of FIGS. 8A to 8C, in accordance with certain embodiments of the present technology.

Thus, according to certain non-limiting embodiments of the present technology, the processor 550 may be configured to smooth the single arch form loop 830. With reference to FIG. 9A, there is depicted a portion of the arch form 3D representation 600 including the single arch form loop 830 and a smoothed single arch form loop 930, in accordance with certain non-limiting embodiment of the present technology.

As it can be appreciated from FIG. 9A, the single arch form loop 830 includes kinks, such as a given kink 902, smoothing which, the processor 550 may be configured to generate the smoothed single arch form loop 930, as will be described below.

Figure 9B:
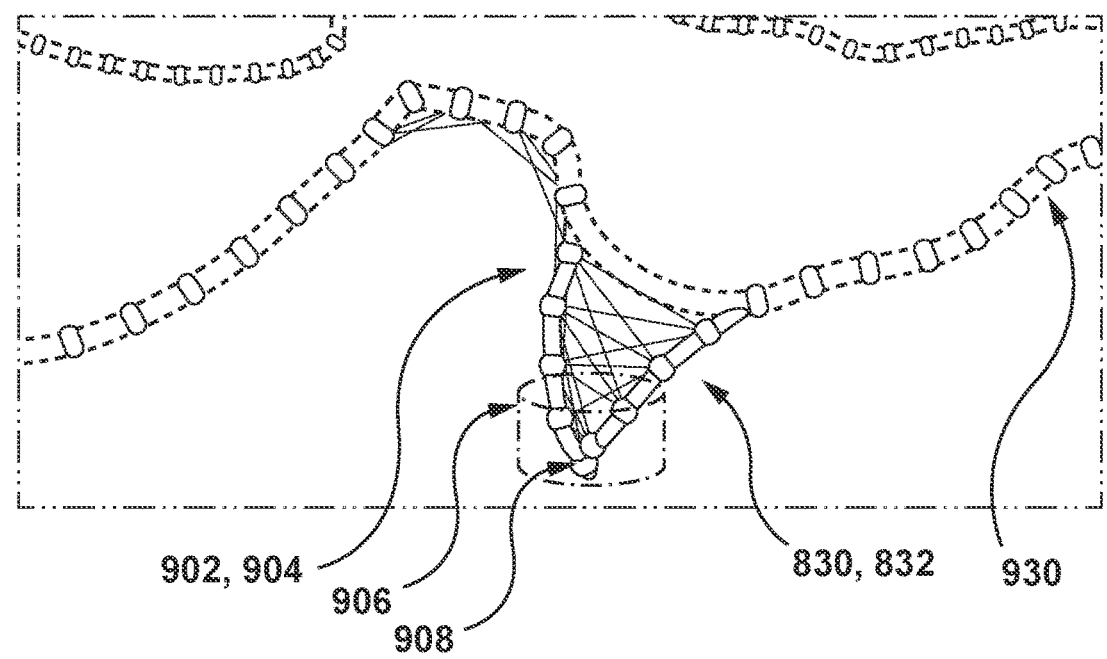

With reference to FIG. 9B, there is depicted a schematic diagram of a step for smoothing, by the processor 550, the given kink 902 for generating the smoothed single arch form loop 930, in accordance with certain non-limiting embodiments of the present technology.

In some non-limiting embodiments of the present technology, the processor 550 may be configured to identify, within the plurality of single arch form loop vertices 832, dense vertex clusters including vertices of the plurality of single arch form loop vertices 832 having a density higher than a predetermined density threshold value. According to certain non-limiting embodiments of the present technology, the dense vertex clusters may be indicative of kinks within the single arch form loop 830—such as a given dense vertex cluster 904 associated with the given kink 902.

Thus, to identify the given dense vertex cluster 904, in some non-limiting embodiments of the present technology, the processor 550 may be configured to determine, for each one of the plurality of single arch form loop vertices 832, a number of neighboring single arch form loop vertices within a predetermined neighborhood associated therewith, such as a predetermined volume 906.

For example, the processor 550 may be configured to determine that the number of single arch form loop vertices within the predetermined volume 906 associated with a given single arch form loop vertex 908 is equal to or greater than a predetermined vertex number threshold value, then the processor 550 may be configured to remove the given single arch form loop vertex 908. The predetermined vertex number threshold value may be thus indicative of the vertex density within the predetermined volume 906. In some non-limiting embodiments of the present technology, the predetermined vertex number threshold value may be, for example, 7; however, in other non-limiting embodiments of the present technology, the predetermined vertex number threshold value may be, without limitation, 3, 5, 10, as an example.

Thus, according to certain non-limiting embodiments of the present technology, by iteratively applying the approach described above to each one of the plurality of single arch form loop vertices 832, until each one thereof has no more neighboring vertices than the predetermined threshold value, the processor 550 may be configured to generate a plurality of smoothed single arch form loop vertices 932 defining the smoothed single arch form loop 930. In other words, based on the predetermined vertex number threshold value, the processor 550 may be configured to either include single arch form loop vertices of the single arch form loop 830 in the plurality of smoothed single arch form loop vertices 932, or exclude them therefrom, thereby eliminating dense vertex clusters, such as the given dense vertex cluster 904.

Further, according to certain non-limiting embodiments of the present technology, based on the plurality of smoothed single arch form loop vertices 932, the processor 550 may be configured to generate the smoothed single arch form loop 930 smoothing portions associated with excluded single arch form loop vertices by applying one or more smoothing algorithms. In some non-limiting embodiments of the present technology, the one or more smoothing algorithms may include, without limitation, a Bezier smoothing algorithm, a Kernel smoothing algorithm, a spline smoothing algorithm, and the like.

Figure 10:
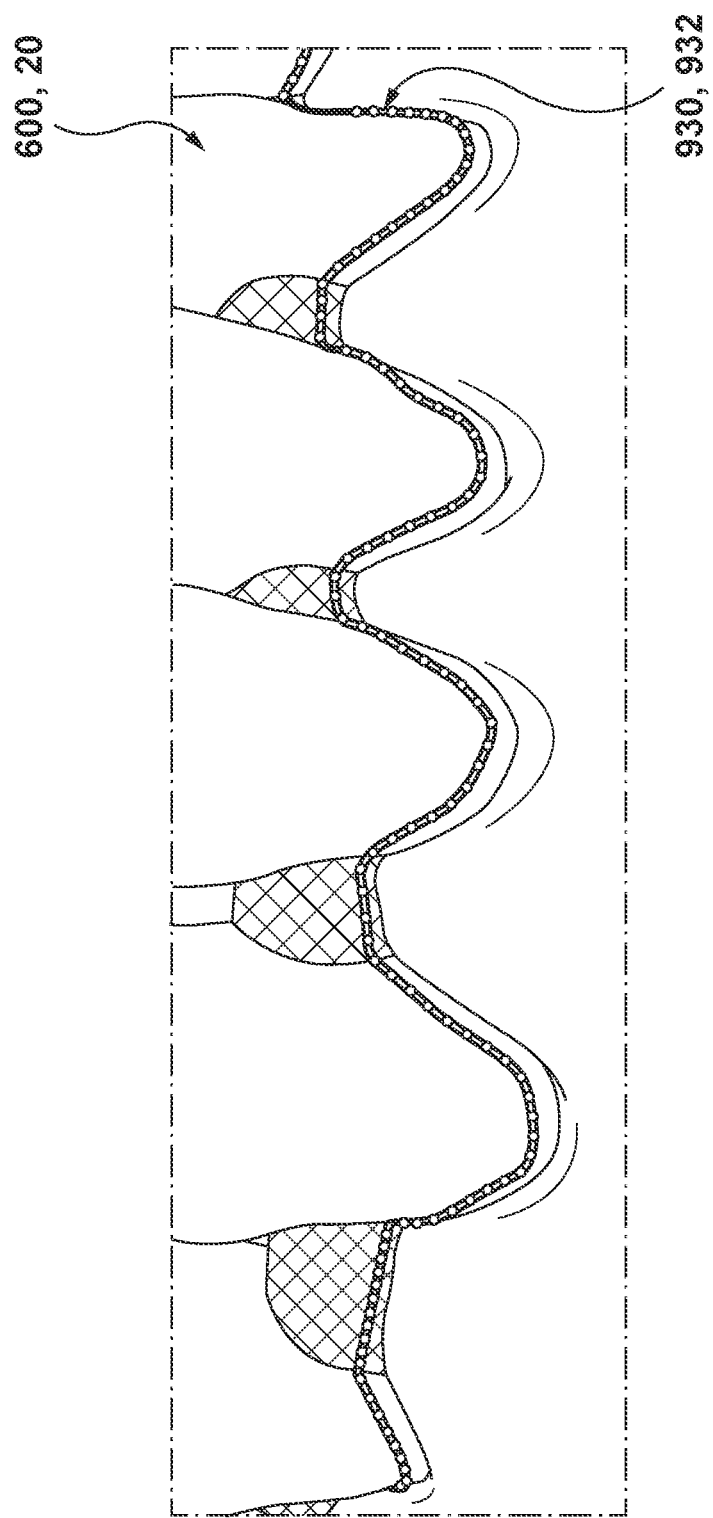
FIG. 10 depicts a schematic diagram of the smoothed single arch form loop of FIG. 9B, in accordance with certain non-limiting embodiments of the present technology.

In additional non-limiting embodiments of the present technology, after the applying the one ore more smoothing algorithms, the processor 550 may be configured to redistribute the plurality of smoothed single arch form loop vertices 932 uniformly along the smoothed single arch form loop 930 in a fashion similar to that described above in respect of the normalizing the vertices of the first individual segmentation loop 612. Thus, the processor 550 may be configured to generate the smoothed single arch form loop 930 whose vertices are equally spaced from each other, as depicted in FIG. 10, in accordance with certain non-limiting embodiments of the present technology.

In some non-limiting embodiments of the present technology, the processor 550 may be configured to use the smoothed single arch form loop 930 as the cut line 304 for further producing the aligner 10. To that end, as mentioned hereinabove, the processor 550 may be configured to cause the marking subsystem 440 of the system 400 to apply each one of the plurality of smoothed single arch form loop vertices 932 onto the unfinished aligner 300, for example, onto an inner or outer surface thereof. Further, the processor 550 may be configured to cause the forming subsystem 450 to detect, by the camera device 452, the smoothed single arch form loop 930 on the unfinished aligner 300 and cut, by the cutting device 454, therealong, thereby producing the aligner 10 for use by the subject in the course of the orthodontic treatment.

In other non-limiting embodiments of the present technology, the processor 550 may be configured to cause the forming subsystem 450 to cut the unfinished aligner 300 without preliminarily detecting the cut line 304 thereon—for example, based on received data indicative of a position of the cut line 304 within the unfinished aligner 300. In some non-limiting embodiments of the present technology, the processor 550 may be configured to receive the data indicative of the position of the cut line 304 within the unfinished aligner 300 including at least one of Cartesian coordinates; angular data indicative of a cutting angle for cutting the unfinished aligner 300; and a distance form the cutting device 454, as an example.

More specifically, in some non-limiting embodiments of the present technology, in order to cause producing of the aligner 10 based on the smoothed single arch form loop 930, the processor 550 may be configured to apply one of the approaches described in the co-owned U.S. patent application Ser. No. 16/704,718 filed on Dec. 5, 2019, entitled "SYSTEMS AND METHODS FOR FORMING DENTAL APPLIANCES", the content of which is hereby incorporated by reference in its entirety.

In yet other non-limiting embodiments of the present technology, the processor 550 may be configured to use the smoothed single arch form loop 930 defining the open edge of the channel 26 of the aligner 10 to generate the aligner 3D representation for further producing the aligner 10 by means of the 3D printing techniques. In this respect, in certain non-limiting embodiments of the present technology, the smoothed single arch form loop 930 may be projected onto the aligner 3D representation of the aligner 10 to define the edge of the channel 26 of the aligner 10.

Method

Figure 11:
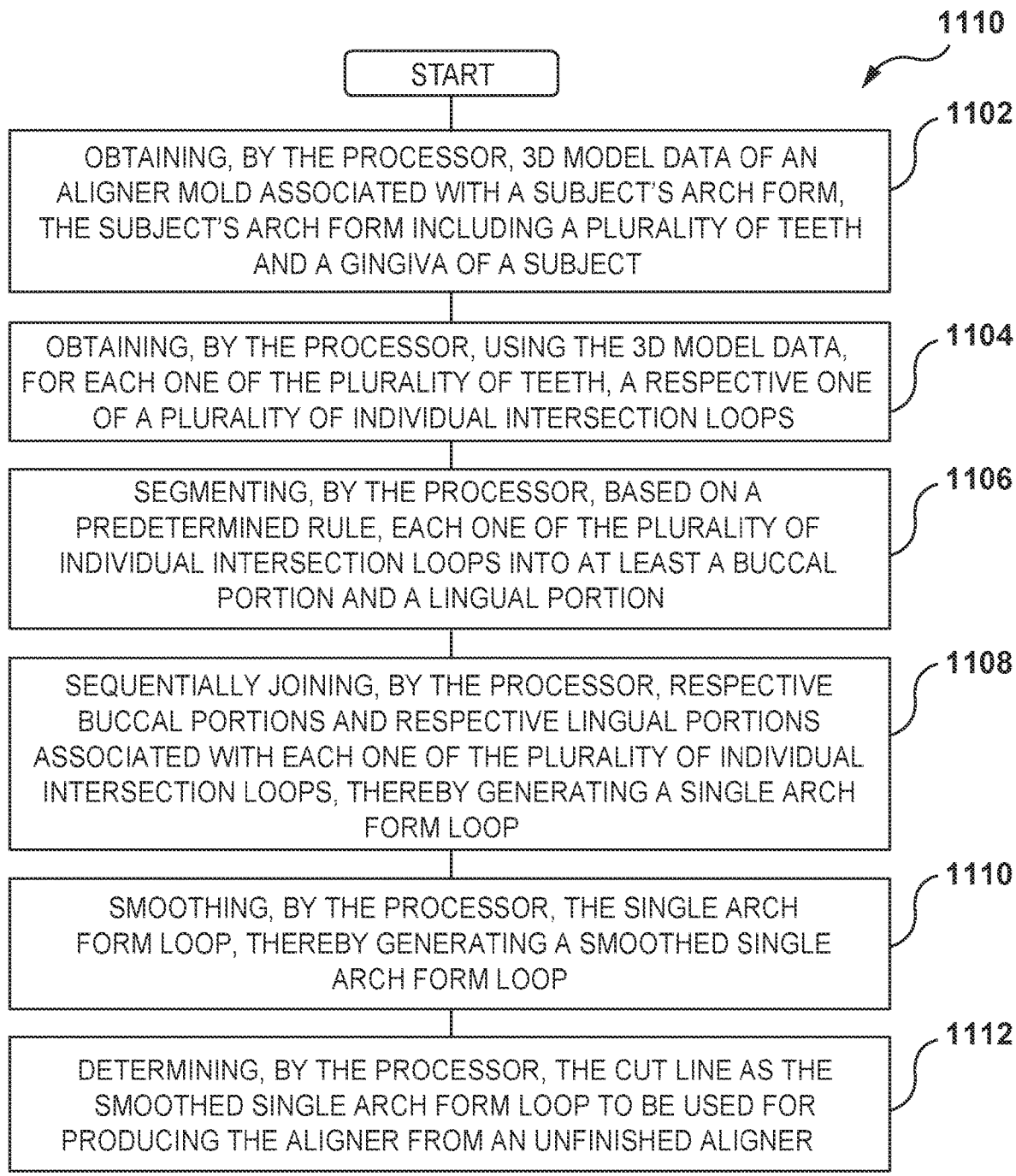
FIG. 11 depicts a flowchart of a method of determining the cut line of FIG. 3, according to certain embodiments of the present technology.

Given the architecture and the examples provided hereinabove, it is possible to execute a method for determining a cut line for producing an aligner—such as the cut line 304 of the aligner 10. With reference now to FIG. 11, there is depicted a flowchart of a method 1100, according to certain non-limiting embodiments of the present technology. The method 1100 may be executed by the processor 550 of the system 400.

Step 1102: Obtaining, by the Processor, 3D Model Data of a Subject's Arch Form, the Subject's Arch Form Including a Plurality of Teeth and a Gingiva of a Subject The method commences at step 1102 with the processor 550 being configured to receive a 3D representation of the subject's archform—such as the arch form 3D representation 600 depicted in FIG. 6, as described above with reference to FIGS. 4 and 6.

The method further advances to step 1104.

Step 1104: Obtaining, by the Processor, Using the 3D Model Data, for Each One of the Plurality of Teeth, a Respective One of a Plurality of Individual Intersection Loops Further, at step 1104, as described above with reference to FIG. 6, the processor 550 may be configured to receive, for each tooth 3D representation of the arch form 3D representation 600, the plurality of individual segmentation loops 610—such as the first individual segmentation loop 612 of the first tooth 3D representation 602 associated with the first tooth 11.

In some non-limiting embodiments of the present technology, the processor 550 may be configured to determine the plurality of individual segmentation loops 610. For example, the processor 550 may be configured to apply one of the approaches described in the co-owned U.S. Pat. No. 10,695,147-B1 issued on Jun. 30, 2020, entitled "METHOD AND SYSTEM FOR DENTAL BOUNDARY DETERMINATION"; the content of which is hereby incorporated by reference in its entirety.

More specifically, according to certain non-limiting embodiments of the present technology, in order to determine the first individual segmentation loop 612, the processor 550 may be configured to: (i) receive the arch form 3D representation 600 associated with the lower arch form 20; (ii) define, around the first tooth 3D representation 602, a first individual segmentation loop prototype around it of the first individual segmentation loop 612; (iii) for each vertex of a plurality of vertices of the first individual segmentation loop prototype, determine an indication of curvature thereof; (iv) determine, based on the indication of curvature corresponding to the respective vertex, a predicted likelihood parameter for each vertex of the plurality of vertices, wherein the predicted likelihood parameter may indicate a predicted likelihood that a respective vertex corresponds to the first individual segmentation loop 612 between the first tooth 11 and the lower gingiva 18; and (v) use the predicted likelihood parameter of the respective vertices to select the vertices defining the first individual segmentation loop 612.

In additional non-limiting embodiments of the present technology, the processor 550 may further be configured to normalize the vertices of the first individual segmentation loop 612 equalizing distances therebetween with the predetermined step, as described above with reference to FIG. 6.

Further, in some non-limiting embodiments of the present technology, the processor 550 may be configured to translate each one of the plurality of individual segmentation loops 610 along crown portions associated with each one of the tooth 3D representations of the lower teeth 16—such as the first tooth 3D representation 602, the second tooth 3D representation 604, and the third tooth 3D representation 606.

In some non-limiting embodiments, the processor 550 may be configured to translate each vertex of each one of the plurality of individual segmentation loops 610 along a respective reference circle determined therein—as described above with reference to FIGS. 7A and 7B in respect of the first individual segmentation loop 612 associated with the first tooth 3D representation 602. Thus, the processor 550 may be configured to generate the first offset plurality of vertices 720 defining the first offset individual segmentation loop 722 of the plurality of offset individual segmentation loops 730.

The method thus proceeds to step 1106.

Step 1106: Segmenting, by the Processor, Based on a Predetermined Rule, Each One of the Plurality of Individual Intersection Loops into at Least a Buccal Portion and a Lingual Portion At step 1106, according to certain non-limiting embodiments of the present technology, the processor 550 may be configured to segment each one of the plurality of offset individual segmentation loops 730, thereby defining the respective lingual portions and the respective buccal portions thereof. For example, as described above with reference to FIG. 8B, the processor 550 may be configured to segment the first offset individual segmentation loop 722 into the first lingual portion 810, the first buccal portion 812, the first mesial portion 814, and the first distal portion 816.

To that end, according to certain non-limiting embodiments of the present technology, the processor 550 may be configured to obtain interdental filler models—such as the first interdental filler model 802 and the second interdental filler model 804 respectively associated with the first interdental space 17 and the second interdental space 19.

In some non-limiting embodiments of the present technology, a given interdental filler model, such as the first interdental filler model 802 may be generated by third-party software based on the arch form 3D representation 600 including the plurality of individual segmentation loops 610 and stored in a data format receivable by the processor 550.

However, in other non-limiting embodiments of the present technology, the processor 550 may be configured to determine the first interdental filler model 802 by applying one or more approaches described in the co-owned U.S. patent application Ser. No. 17/143,033, filed concurrently with the present application, and entitled "METHOD AND SYSTEM FOR GENERATING INTERDENTAL FILLER MODELS" the content of which is hereby incorporated by reference in its entirety.

More specifically, in certain non-limiting embodiments of the present technology, in order to determine the first interdental filler model 802, the processor 550 may be configured to: (i) receive the arch form 3D representation 600 including the plurality of individual segmentation loops 610; (ii) determine locations for ends of the first interdental filler model 802 between the first tooth 3D representation 602 and the second tooth 3D representation 604 by: determining a first vertex on a tooth axis associated with first tooth 3D representation 602, and determining a second vertex on a tooth axis of the second tooth 3D representation 604; (iii) determine a curvature of the first interdental filler model 802 by: determining a first arc connecting the first vertex to the second vertex; (iv) determine a shape of the first interdental filler model 802 by: determining a second arc having a center at the first vertex, determining a third arc having a center at the second vertex, and interpolating a set of arcs between the second arc and the third arc, wherein a center of each arc in the set of arcs corresponds to a vertex on the first arc; (v) ground the first interdental filler model 802 on the gingiva 3D representation 608 by: extending each arc of the set of arcs to end on a ground surface; and (vi) generate the first interdental filler model 802 by: connecting free ends of each arc of the set of arcs, thereby forming a set of sections, lofting each section of the set of sections, and forming the first interdental filler model 802 based on the set of sections.

By so doing, the processor 550 may be configured to generate respective interdental filler models between tooth 3D representations associated with each pairs of adjacent ones of the lower teeth 16. Accordingly, in some non-limiting embodiments of the present technology, the processor 550 may not generate interdental filler models adjacent to distal surfaces of the distal most ones of the lower teeth 16.

Thus, as can be appreciated from FIG. 8B, the first interdental filler model 802 and the second interdental filler model 804 may "cut out" the first mesial portion 814 and the first distal portion 816 in the first offset individual segmentation loop 722 leaving only the first lingual portion 810 and the second buccal portion 822 thereof. By so doing, the processor 550 may be configured to segment each one of the plurality of offset individual segmentation loops 730 into the respective lingual portions and the respective buccal portions.

The method hence advances to step 1108.

Step 1108: Sequentially Joining, by the Processor, Respective Buccal Portions and Respective Lingual Portions Associated with Each One of the Plurality of Individual Intersection Loops, Thereby Generating a Single Arch Form Loop At step 1108, according to certain non-limiting embodiments of the present technology, the processor 550 may be configured to join the respective lingual portions and the respective buccal portions of the plurality of offset individual segmentation loops 730 in a sequential manner. More specifically, the processor 550 may be configured to join the respective lingual portions and the respective buccal portions, for example, via linear segments along respective interdental filler models, such as joining the first buccal portion 812 with the second buccal portion 822 along the first interdental filler model 802, and joining the first buccal portion 812 with the third buccal portion 833 along the second interdental filler model 804, as depicted in FIG. 8A.

Thus, the processor 550 may be configured to determine the single arch form loop 830 spaced away from the gingiva 3D representation 608.

The method thus proceeds to step 1110.

Step 1110: Smoothing, by the Processor, the Single Arch Form Loop, Thereby Generating a Smoothed Single Arch Form Loop At step 1110, according to certain non-limiting embodiments of the present technology, the processor 550 may be configured to smooth the single arch from loop 830 as it may include kinks defined by abrupt junctions between some of the tooth 3D representations of the lower teeth 16 and respective interdental filler models—such as the given kink 902 depicted in FIG. 9A.

To that end, the processor 550 may be configured to identify the plurality of single arch form loop vertices 832 of the single arch form loop 830, normalize the plurality of single arch form loop vertices as discussed above with reference to the first individual segmentation loop 612, and determine therein dense vertex cluster associated with the kinks—such as the given dense vertex cluster 904 associated with the given kink 902.

Further, the processor 550 may be configured to remove the given dense vertex cluster 904 based on the predetermined density threshold, as described above with reference to FIG. 9B, thereby smoothing the given kink 902. Thus, the processor 550 may be configured to remove dense vertex clusters within the plurality of single arch form loop vertices 832, thereby smoothing the kinks therealong and generating the plurality of smoothed single arch form loop vertices 932 defining the smoothed single arch form loop 930 depicted in FIG. 10.

In additional non-limiting embodiments of the present technology, the processor 550 may further be configured to normalize the plurality of smoothed single arch form loop vertices 932 along the smoothed single arch form loop 930 as described above in respect of the normalizing the vertices of the first individual segmentation loop 612.

The method thus advances to step 1112.

Step 1112: Determining, by the Processor, the Cut Line as the Smoothed Single Arch Form Loop, the Cut Line to be Used for Producing the Aligner At step 1112, according to certain non-limiting embodiments of the present technology, the processor 550 may be configured to determine the cut line 304 as the smoothed single arch form loop 930, which may further be used for producing the aligner 10.

For example, in some non-limiting embodiments of the present technology, the processor 550 may be configured to cause the marking subsystem 440 of the system 400 to apply the smoothed single arch form loop or each one of the plurality of smoothed single arch form loop vertices 932 onto the unfinished aligner 300, for example, onto the inner or outer surface thereof. Further, the processor 550 may be configured to cause the forming subsystem 450 to detect, by the camera device 452, the smoothed single arch form loop 930 on the unfinished aligner 300 and cut, by the cutting device 454, therealong, thereby producing the aligner 10 for use by the subject in the course of the orthodontic treatment.

In other non-limiting embodiments of the present technology, the processor 550 may be configured to cause the forming subsystem 450 to cut the unfinished aligner 300 without preliminarily detecting the cut line 304 thereon—for example, based on received data indicative of a position of the cut line 304 within the unfinished aligner 300. In some non-limiting embodiments of the present technology, the processor 550 may be configured to receive the data indicative of the position of the cut line 304 within the unfinished aligner 300 including at least one of Cartesian coordinates; angular data indicative of a cutting angle for cutting the unfinished aligner 300; and a distance form the cutting device 454, as an example.

In yet other non-limiting embodiments of the present technology, the processor 550 may be configured to use the smoothed single arch form loop 930 defining the open edge of the channel 26 of the aligner 10 to generate the aligner 3D representation for further producing the aligner 10 by means of the 3D printing techniques. In certain embodiments, the smoothed single arch form loop 930 may be projected onto a closest point on a mesh of a 3D model of an aligner, to augment the 3D model of the aligner.

It should be expressly understood that, in some non-limiting embodiments of the present technology, the processor 550 may be configured to apply the method for determining the cut line 304 described hereinabove, mutatis mutandis, to the aligner mold 3D representation of the aligner mold (not depicted) indicative of the given configuration of the lower arch form 20 associated with the respective stage of the orthodontic treatment and used for producing the unfinished aligner 300.

Thus, certain non-limiting embodiments of the method 1100 allow determining the cut line 304 of the aligner 10 reproducing actual anatomical configuration of each crown portion of the lower teeth 16 as well as considering interdental spaces between adjacent ones of the lower teeth 16 (such as the first interdental space 17 and the second interdental space 19), which may be associated with an improved comfort of using the aligner 10 by the subject. The aligner 10 produced using the cut line 304 may thus allow for a more effective implementation of the orthodontic treatment.

The method 1100 thus terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining a cut line of an aligner, the method being executable by a processor of a computer system, the method comprising:
    obtaining, by the processor, 3D model data of a subject's arch form, the subject's arch form including a plurality of teeth and a gingiva of a subject;
    obtaining, by the processor, using the 3D model data, for each one of the plurality of teeth, a respective one of a plurality of individual segmentation loops,
        a given one of the plurality of individual segmentation loops being indicative of a boundary between a given one of the plurality of teeth and the gingiva;
    segmenting, by the processor, each one of the plurality of individual segmentation loops into a buccal portion and a lingual portion;
    sequentially joining, by the processor, respective buccal portions and respective lingual portions associated with each one of the plurality of individual segmentation loops, thereby generating a single arch form loop;
    smoothing, by the processor, the single arch form loop, thereby generating a smoothed single arch form loop; and
    determining, by the processor, the cut line as the smoothed single arch form loop, the cut line to be used for producing the aligner.

2. The method of claim 1, further comprising:
    prior to the segmenting each one of the plurality of individual segmentation loops, translating each one of the plurality of individual segmentation loops along a respective tooth in a direction of a crown portion thereof at a predetermined distance, thereby generating a plurality of offset individual segmentation loops; and
    generating the single arch form loop based on the plurality of offset individual segmentation loops.

3. The method of claim 2, wherein translating a given one of the plurality of individual segmentation loops associated with a respective tooth, comprises:
    identifying, by the processor, based on the 3D model data, points defining the given one of the plurality of individual segmentation loops;
    determining, by the processor, at a given one of the points, a respective normal vector associated with the given one of the plurality of individual segmentation loops, the respective normal vector being directed to the crown portion of the respective tooth;
    determining, by the processor, at the given one of the points, a respective tooth inward normal vector, the respective tooth inward normal vector being directed inwardly in the crown portion of the respective tooth and perpendicular to the respective normal vector;
    determining, by the processor, at the given one of the points, a respective reference plane defined by an intersection between the respective normal vector and the respective tooth inward normal vector;
    generating, by the processor, in the respective reference plane, a respective one of a plurality of reference circles originating in the given one of the points defining the given one of the plurality of individual segmentation loops, each one of the plurality of reference circles being of a reference radius having a value of the predetermined distance; and determining, by the processor, a respective intersection point of a plurality of intersection points between each one of the plurality of reference circles with the crown portion of the respective tooth;

generating, by the processor, based on the plurality of intersection points, a respective offset individual segmentation loop of the plurality of offset tee segmentation loops.

4. The method of claim 1, further comprising:

identifying, by the processor, points defining the given one of the plurality of individual segmentation loops;

normalizing, by the processor, the points along the given one of the plurality of individual segmentation loops, the normalizing comprising redistributing the points within the given one of the plurality of individual segmentation loops uniformly, equalizing distances therebetween.

5. The method of claim 4, wherein the redistributing is executed with a predetermined step indicative of a distance between the points along the given one of the plurality of individual segmentation loops.

6. The method of claim 1, further comprising obtaining, for a first tooth of the plurality of teeth:

at least one bridge between the first tooth and a second tooth adjacent thereto, the at least one bridge being representative of a surface extending in a mesiodistal direction between the first tooth and the second tooth, and filling in an interdental gap therebetween; and wherein:

segmenting a first one of the plurality of the plurality of individual segmentation loops associated with the first tooth comprising identifying, by the processor, a respective lingual portion and a respective buccal portion thereof based at least on the at least one bridge associated therewith.

7. The method of claim 6, wherein joining respective buccal portions and respective lingual portions of the first one of the plurality of individual segmentation loops and a second one of the plurality of individual segmentation loops, associated with the second tooth, comprises joining the respective buccal portions and the respective lingual portions along respective lines extending therebetween along the at least one bridge.

8. The method of claim 1, wherein the smoothing the single arch form loop further comprises applying, by the processor, a smoothing algorithm thereto.

9. The method of claim 1, wherein the smoothing the single arch form loop further comprises normalizing a plurality of single arch form loop points defining the single arch form loop, the normalizing comprising:

identifying, within the plurality of single arch form loop points, dense point clusters, the dense point clusters including single arch form loop points having point density therein higher than a predetermined point density threshold value; and excluding the dense point clusters from a plurality of smoothed single arch form loop points defining the smoothed single arch form loop.

10. The method of claim 9, wherein the identifying the dense point clusters comprises:

determining, within a predetermined neighborhood of a given one of the plurality of single arch form loop points, a number of single arch form loop points encompassed therein;

in response to the number of single arch form loop points being lower than a predetermined number threshold value indicative of the predetermined point density threshold value, including the given one of the single arch form loop points in the plurality of smoothed single arch form loop points;

in response to the number of single arch form loop points being equal to or greater than the predetermined number threshold value, excluding the given one of the single arch form loop points from the plurality of smoothed single arch form loop points.

11. The method of claim 1, further comprising applying, by the processor, the smoothed single arch form loop on an unfinished aligner to indicate the cut line thereon to be used for producing the aligner.

12. The method of claim 11, further comprising applying, by the processor, the smoothed single arch form loop on a 3D model of an aligner, wherein the applying the smoothed single arch form loop to the 3D model of the aligner comprises projecting each point of the smoothed single arch form loop onto a closest respective point of a surface of the 3D model of the aligner.

13. The method of claim 1, further comprising using a laser cutting system to cut an unfinished aligner along the smoothed single arch form loop to produce the aligner for the subject.

14. The method of claim 1, further comprising determining, by the processor, each one of the plurality of individual segmentation loops, the determining comprising analyzing, based on the 3D model data, a spatial curvature of a respective one of the plurality of teeth.

15. A system for determining a cut line of an aligner, the system comprising:

a processor;

a non-transitory computer-readable medium comprising instructions;

the processor, upon executing the instructions, being configured to:

obtain 3D model data of a subject's arch form, the subject's arch form including a plurality of teeth and a gingiva of a subject;

obtain, using the 3D model data, for each one of the plurality of teeth, a respective one of a plurality of individual segmentation loops, a given one of the plurality of individual segmentation loops being indicative of a boundary between a given one of the plurality of teeth and the gingiva;

segment, each one of the plurality of individual segmentation loops into a buccal portion and a lingual portion;

sequentially join respective buccal portions and respective lingual portions associated with each one of the plurality of individual segmentation loops, thereby generating a single arch form loop;

smooth the single arch form loop, thereby generating a smoothed single arch form loop; and determine the cut line as the smoothed single arch form loop for producing the aligner.

16. The system of claim 15, wherein, prior to the segmenting each one of the plurality of individual segmentation loops, the processor is further configured to translate each one of the plurality of individual segmentation loops along a respective tooth in a direction of a crown portion thereof at a predetermined distance, thereby generating a plurality of offset individual segmentation loops; and generate the single arch form loop based on the plurality of offset individual segmentation loops.

17. The system of claim 16, wherein in order to translate a given one of the plurality of individual segmentation loops associated with a respective tooth, the processor is further configured to:
   identify, based on the 3D model data, points defining the given one of the plurality of individual segmentation loops;
   determine, at a given one of the points, a respective normal vector associated with the given one of the plurality of individual segmentation loops, the respective normal vector being directed to the crown portion of the respective tooth;
   determine, at the given one of the points, a respective tooth inward normal vector, the respective tooth inward normal vector being directed inwardly in the crown portion of the respective tooth and perpendicular to the respective normal vector;
   determine, at the given one of the points, a respective reference plane defined by an intersection between the respective normal vector and the respective tooth inward normal vector;
   generate, in the respective reference plane, a respective one of a plurality of reference circles originating in the given one of the points defining the given one of the plurality of individual segmentation loops,
      each one of the plurality of reference circles being of a reference radius having a value of the predetermined distance; and
   determine a respective intersection point of a plurality of intersection points between each one of the plurality of reference circles with the crown portion of the respective tooth;
   generate, based on the plurality of intersection points, a respective offset individual segmentation loop of the plurality of offset individual segmentation loops.

18. The system of claim 15, wherein the processor is further configured to: apply the smoothed single arch form loop to an unfinished aligner; and cause projecting each point of the smoothed single arch form loop onto a closest respective point of a surface of the unfinished aligner.

19. The system of claim 15, wherein the processor is further configured to apply the smoothed single arch form loop to an unfinished aligner to indicate the cut line on the unfinished aligner; the system further comprises a laser cutting system communicatively coupled with the processor, and the processor is further configured to cause the laser cutting system to cut the unfinished aligner along the smoothed single arch form loop to produce the aligner for the subject.

20. A method of determining an open edge of an aligner, the method being executable by a processor of a computer system, the method comprising:
   obtaining, by the processor, 3D model data of an aligner mold associated with a subject's arch form, the subject's arch form including a plurality of teeth and a gingiva of a subject;
   obtaining, by the processor, using the 3D model data, for each one of the plurality of teeth, a respective one of a plurality of individual segmentation loops,
      a given one of the plurality of individual segmentation loops being indicative of a boundary between a given one of the plurality of teeth and the gingiva;
   segmenting, by the processor, each one of the plurality of individual segmentation loops into a buccal portion and a lingual portion;
   sequentially joining, by the processor, respective buccal portions and respective lingual portions associated with each one of the plurality of individual segmentation loops, thereby generating a single arch form loop;
   smoothing, by the processor, the single arch form loop, thereby generating a smoothed single arch form loop; and
   determining, by the processor, the open edge of the aligner as the smoothed single arch form loop.

* * * * *